United States Patent
Badhuk et al.

(10) Patent No.: US 12,553,610 B1
(45) Date of Patent: Feb. 17, 2026

(54) GAS TURBINE ENGINE INCLUDING A FUEL NOZZLE HAVING VORTEX GENERATORS

(71) Applicant: GENERAL ELECTRIC COMPANY, Evendale, OH (US)

(72) Inventors: Pabitra Badhuk, Jhargram (IN); Balabhadra Venkata Naga Sai Laxmi Poojitha, Bengaluru (IN); Aritra Chakraborty, Kolkata (IN); Prithiviraaj Pet T, Madurai (IN); Pradeep Naik, Bengaluru (IN); Narasimha Chiranthan Ranganatha, Bengaluru (IN); Karthikeyan Sampath, Bengaluru (IN); Michael T. Bucaro, Arvada, CO (US); Sibtosh Pal, Mason, OH (US)

(73) Assignee: General Electric Company, OH (US)

( * ) Notice: Subject to any disclaimer, the term of this patent is extended or adjusted under 35 U.S.C. 154(b) by 0 days.

(21) Appl. No.: 18/968,296

(22) Filed: Dec. 4, 2024

(51) Int. Cl.
  *F23R 3/28* (2006.01)
  *F23R 3/14* (2006.01)
  *F23R 3/12* (2006.01)

(52) U.S. Cl.
  CPC .......... *F23R 3/283* (2013.01); *F23R 3/14* (2013.01); *F23R 3/12* (2013.01)

(58) Field of Classification Search
  CPC .......... F23R 3/12; F23R 3/14; F23R 3/283
  See application file for complete search history.

(56) References Cited

U.S. PATENT DOCUMENTS

| | | |
|---|---|---|
| 1,011,032 A | 12/1911 | Coles |
| 5,351,477 A | 10/1994 | Joshi et al. |
| 5,408,825 A | 4/1995 | Foss |
| 5,590,529 A | 1/1997 | Joshi |
| 5,675,971 A | 10/1997 | Angel et al. |
| 5,863,195 A | 1/1999 | Feldermann |
| 6,141,967 A | 11/2000 | Angel et al. |
| 6,880,340 B2 | 4/2005 | Saitoh |
| 6,993,916 B2 | 2/2006 | Johnson |
| 7,093,438 B2 | 8/2006 | Dinu |
| 7,424,311 B2 | 9/2008 | Hamasaki et al. |
| 8,186,166 B2 | 5/2012 | Varatharajan et al. |
| 8,276,385 B2 | 10/2012 | Zuo et al. |
| 8,322,143 B2 | 12/2012 | Uhm et al. |

(Continued)

FOREIGN PATENT DOCUMENTS

| | | | |
|---|---|---|---|
| CN | 111520763 A | 8/2020 | |
| EP | 0623786 A1 | 11/1994 | |
| WO | WO-2024213340 A1 * | 10/2024 | ........... F23D 11/00 |

OTHER PUBLICATIONS

English translation of WO 2024213340 (Year: 2024).*

*Primary Examiner* — Thomas P Burke
(74) *Attorney, Agent, or Firm* — Carter, DeLuca & Farrell LLP

(57) ABSTRACT

A gas turbine engine including a compressor section, a combustion section, and a turbine section in a serial flow arrangement, with the combustion section having a fuel nozzle including a fuel nozzle body defining an axis and having an inner surface defining a channel fluidly coupled to a combustion chamber, a support matrix located within the channel comprising a plurality of segments which intersect each other when viewed from aft, and a set of vortex generators located on the support matrix.

18 Claims, 9 Drawing Sheets

(56) References Cited

U.S. PATENT DOCUMENTS

| | | |
|---|---|---|
| 8,539,773 B2 | 9/2013 | Ziminsky et al. |
| 9,134,023 B2 | 9/2015 | Boardman et al. |
| 9,528,444 B2 | 12/2016 | Westmoreland et al. |
| 9,557,061 B2 | 1/2017 | Biagioli et al. |
| 9,650,959 B2 | 5/2017 | Boardman et al. |
| 9,651,259 B2 | 5/2017 | Boardman et al. |
| 9,759,425 B2 | 9/2017 | Westmoreland et al. |
| 9,765,973 B2 | 9/2017 | Chila et al. |
| 10,082,294 B2 | 9/2018 | Laster et al. |
| 10,295,190 B2 | 5/2019 | Boardman et al. |
| 10,352,569 B2 | 7/2019 | Boardman et al. |
| 10,415,832 B2 | 9/2019 | Lee |
| 10,502,425 B2 | 12/2019 | Boardman et al. |
| 11,454,396 B1* | 9/2022 | Boardman ............... F23R 3/16 |
| 12,072,102 B2 | 8/2024 | Andersson |
| 2004/0020210 A1* | 2/2004 | Tanaka .................... F23R 3/14 60/740 |
| 2005/0126755 A1* | 6/2005 | Berry ....................... F02C 5/00 165/80.3 |
| 2008/0078182 A1 | 4/2008 | Evulet |
| 2010/0275604 A1* | 11/2010 | Hall ...................... F23D 11/103 60/748 |
| 2011/0000214 A1 | 1/2011 | Helmick et al. |
| 2014/0123665 A1* | 5/2014 | Wood ....................... F23R 3/12 60/774 |
| 2014/0260315 A1 | 9/2014 | Westmoreland et al. |
| 2014/0338338 A1 | 11/2014 | Chila et al. |
| 2017/0146242 A1* | 5/2017 | Meadows ............... F23D 14/64 |
| 2017/0298884 A1 | 10/2017 | Patel et al. |
| 2018/0128491 A1 | 5/2018 | Boardman et al. |
| 2018/0216828 A1 | 8/2018 | Johansson et al. |
| 2019/0154263 A1 | 5/2019 | Bothien et al. |
| 2020/0024983 A1* | 1/2020 | Simonetti ................ F02K 1/46 |
| 2020/0041129 A1* | 2/2020 | Pal ........................... F23R 3/14 |
| 2020/0173662 A1 | 6/2020 | Boehm et al. |
| 2021/0010674 A1 | 1/2021 | Thariyan et al. |
| 2021/0207808 A1 | 7/2021 | Mishra et al. |
| 2022/0003167 A1* | 1/2022 | Shershnyov ............. F23R 3/16 |
| 2023/0358403 A1 | 11/2023 | Singh |

* cited by examiner

US 12,553,610 B1

GAS TURBINE ENGINE INCLUDING A FUEL NOZZLE HAVING VORTEX GENERATORS

TECHNICAL FIELD

The present subject matter relates generally to a combustion section for a turbine engine.

BACKGROUND

Turbine engines are driven by a flow of combustion gases passing through the engine to rotate a multitude of turbine blades, which, in turn, rotate a compressor to provide compressed air to the combustor for combustion. A combustor can be provided within the turbine engine and is fluidly coupled with a turbine into which the combusted gases flow.

Historically, hydrocarbon fuels are used in the combustor of a turbine engine. Generally, air and fuel are fed to a combustion chamber, the air and fuel are mixed, and then the fuel is burned in the presence of the air to produce hot gas. The hot gas is then fed to a turbine where it cools and expands to produce power. Byproducts of the fuel combustion typically include environmentally unwanted byproducts, such as nitrogen oxide and nitrogen dioxide (collectively called NOx), carbon monoxide (CO), unburned hydrocarbons (UHC) (e.g., methane and volatile organic compounds that contribute to the formation of atmospheric ozone), and other oxides, including oxides of sulfur (e.g., $SO_2$ and $SO_3$).

To reduce the environmentally unwanted byproducts, other fuels, such as hydrogen, are being explored. Hydrogen or hydrogen mixed with another element has a higher flame temperature than traditional hydrocarbon fuels. That is, hydrogen or a hydrogen mixed fuel typically has a wider flammable range and a faster burning velocity than traditional hydrocarbon-based fuels.

BRIEF DESCRIPTION OF THE DRAWINGS

A full and enabling disclosure, including the best mode thereof, directed to one of ordinary skill in the art, is set forth in the specification, which makes reference to the appended figures in which.

DETAILED DESCRIPTION

Figure 1:
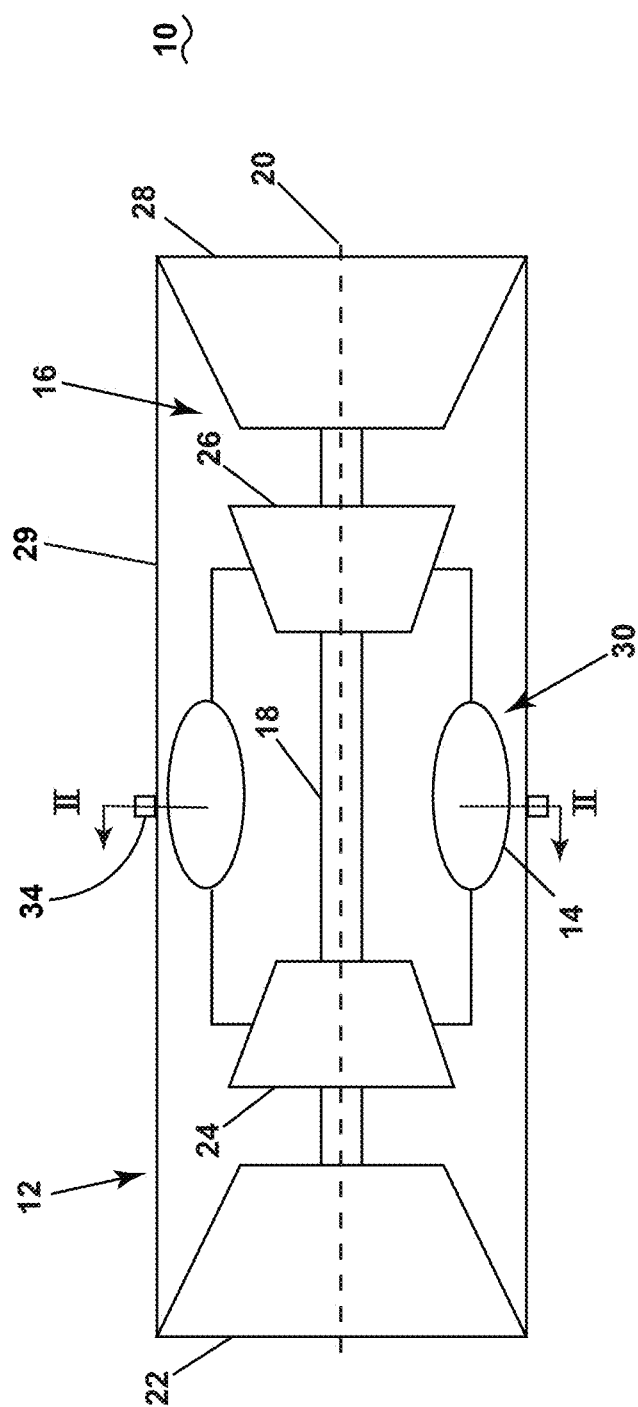
FIG. 1 is a schematic view of a turbine engine having a compressor section, a combustion section, and a turbine section in accordance with various aspects described herein.

Aspects of the disclosure described herein are directed to a combustion section for a turbine engine. The combustion section has a combustor and a fuel nozzle. The combustor has a combustion chamber. The fuel nozzle has a channel opening to the combustion chamber. The fuel nozzle has a support matrix and a set of vortex generators located on the support matrix.

During operation, a flow of compressed air is fed to the channel of the fuel nozzle. The compressed air flows over the support matrix and the set of vortex generators. A flow of fuel is optionally fed through a portion or all of the set of vortex generators. The generation of vortices increases the capability of the flow of fuel to be mixed with the compressed air within the fuel nozzle.

The fuel nozzle including the support matrix and the set of vortex generators is especially advantageous for use when feeding a flow of hydrogen-containing fuel (hereinafter, "$H_2$ fuel") to the combustion chamber. $H_2$ fuel can include a gaseous $H_2$ fuel, a liquid $H_2$ fuel, or a combination thereof. The flow of $H_2$ fuel can further be mixed with other fuels or fluids such as, but not limited to, natural gas, coke oven gas, diesel, Jet-A, or the like.

$H_2$ fuels, when compared to traditional fuels (e.g., carbon fuels, petroleum fuels, etc.), have a lower carbon emissions. However, $H_2$ fuels burn hotter than and are relatively more unstable when compared to traditional fuels. For example, $H_2$ fuels have a higher burn rate and velocity than traditional fuels. As such, an improper mixture of $H_2$ fuel and compressed air can result in flashback occurring or a flame generated through ignition of the $H_2$ fuel spreading to unwanted regions of the turbine engine. The improper mixture of $H_2$ fuel and compressed air, for example, creates pockets of $H_2$ fuel that in some instances can ignite within the fuel nozzle (e.g., flashback). The fuel nozzle as described herein, including the support matrix having the set of vortex generators is especially suited for combustion sections utilizing $H_2$ fuel through generation of the turbulence.

For purposes of illustration, the present disclosure will be described with respect to a turbine engine. It will be understood, however, that aspects of the disclosure described herein are not so limited and that a combustion section as described herein can be implemented in engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

With the combustors and fuel nozzle assemblies described herein, gaseous hydrogen fuel can be used without the need of diluents. In some embodiments, no diluent is added to the combustion chamber and the fuel is substantially completely diatomic hydrogen without diluent. As used herein, the term "substantially completely," is used to describe the amount of a particular element or molecule (e.g., diatomic hydrogen), refers to at least 99% by mass of the described portion of the element or molecule, such as at least 97.5%, such as at least 95%, such as at least 92.5%, such as at least 90%, such as at least 85%, or such as at least 75% by mass of the described portion of the element or molecule. In some examples, the fuel is entirely (e.g., 100%) hydrogen by mass.

As used herein, the term "swirled" fluid flow or iterations thereof refers to an axisymmetric fluid flow having a circumferential rotation, or swirl, about a central axis. The amount of swirl that fluid flow has is quantified by a swirl number. The swirl number is defined as an integral of the tangential momentum to the axial momentum of the flow of fluid with respect to the central axis.

As used herein, the term "turbulent" fluid flow or iterations thereof refers to a non-laminar, chaotic and localized fluid flow. Turbulence, for example, can be in the form of a localized swirls, vortices or eddies. The turbulence of a turbulent fluid flow is quantified through use of turbulent kinetic energy and the Reynolds number of the fluid.

In relation to one another, the swirl of a fluid flow refers to a large-scale organized rotational movement of the fluid flow, while the turbulence of a fluid flow refers to a localized chaotic movement of the fluid flow. It will be appreciated that a fluid flow can include both swirl and turbulence.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", "third", etc. may be used interchangeably to distinguish one component from another and are not intended to signify location or importance of the individual components.

The terms "forward" and "aft" refer to relative positions within a turbine engine or vehicle and refer to the normal operational attitude of the turbine engine or vehicle. For example, with regard to a turbine engine, forward refers to a position closer to an engine inlet and aft refers to a position closer to an engine exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluidly coupled" means that a fluid is capable of making the connection between the areas specified.

The term "nozzle" has been used in various ways in the context of turbine engines. In the instant application, "nozzle" refers to a component having a portion for fluid coupling to a fuel supply and having at least one portion for fluidly coupling with a combustor portion, a combustor liner, a combustion chamber, or combinations thereof.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only, and the dimensions, positions, order, and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Uses of "and" and "or" are to be construed broadly. For example, and without limitation, uses of "and" do not necessarily require all elements or features listed, and uses of "or" are inclusive unless such a construction would be illogical.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and systems. In at least some instances, the approximating language may correspond to the precision of an instrument for measuring the value, or the precision of the methods or machines for constructing or manufacturing the components and systems. For example, the approximating language may refer to being within a 1, 2, 4, 5, 10, 15, or 20 percent margin in either individual values, range(s) of values and endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

"Proximate" as used herein is a descriptor for locating parts described herein. Further, the term "proximate" means nearer or closer to the part recited than the following part. For example, a first aperture proximate a wall, the first aperture located upstream from a second aperture means that the first aperture is closer to the wall than the first aperture is to the second aperture.

Additionally, as used herein, a "controller" can include a component configured or adapted to provide instruction, control, operation, or any form of communication for operable components to effect the operation thereof. A controller can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), proportional resonant controller (PR), a hardware-accelerated logic controller (e.g., for encoding, decoding, transcoding, etc.), the like, or a combination thereof. Non-limiting examples of a controller can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein. In another non-limiting example, a controller can be configured for comparing a first value with a second value and operating and controlling operations of additional components based on the satisfying of that comparison. For example, when a sensed, measured, or provided value is compared with another value, including a stored or predetermined value, the satisfaction of that comparison can result in actions, functions, or operations controllable by the controller.

FIG. 1 is a schematic view of a turbine engine 10 (e.g., a gas turbine engine). As a non-limiting example, the turbine engine 10 can be used within an aircraft. The turbine engine 10 can include, at least, a compressor section 12, a combustion section 14, and a turbine section 16 in a serial flow arrangement. A drive shaft 18 rotationally couples the compressor section 12 and turbine section 16, such that rotation of one affects the rotation of the other and defines a rotational axis 20 for the turbine engine 10. The turbine engine 10 includes an engine casing 29. The engine casing 29 houses at least a portion of the compressor section 12, the combustion section 14, and the turbine section 16.

The compressor section 12 can include a low-pressure (LP) compressor 22, and a high-pressure (HP) compressor 24 serially fluidly coupled to one another. The turbine section 16 can include an HP turbine 26, and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft and an HP drive shaft. The LP drive shaft can couple the LP compressor 22 to the LP turbine 28, and the HP drive shaft can couple the HP compressor 24 to the HP turbine 26. An LP spool is defined as the combination of the LP compressor 22, the LP turbine 28, and the LP drive shaft such that the rotation of the LP turbine 28 can apply a driving force to the LP drive shaft, which in turn can rotate the LP compressor 22. An HP spool is defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 includes a plurality of axially spaced stages (not illustrated). Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a shroud or casing, which can extend circumferentially about and enshroud one or more sections of the turbine engine 10. It will be appreciated that the representation of the compressor section 12 is merely schematic and that there can be any number of blades, vanes and stages. Further, it is contemplated that there can be any number of other components within the compressor section 12.

Similar to the compressor section 12, the turbine section 16 includes a plurality of axially spaced stages, with each stage having a set of circumferentially spaced, rotating blades and a set of circumferentially spaced, stationary vanes. The turbine blades for a stage of the turbine section 16 can be mounted to a disk which is mounted to the drive shaft 18. Each set of blades for a given stage can have its own disk. The vanes of the turbine section 16 can be mounted to the shroud or casing in a circumferential manner. It is noted that there can be any number of blades, vanes and turbine stages as the illustrated turbine section 16 is merely a schematic representation. Further, it is contemplated that there can be any number of other components within the turbine section 16.

The combustion section 14 is provided serially between the compressor section 12 and the turbine section 16. The combustion section 14 is fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14. The combustion section 14 includes a combustor 30.

The turbine engine 10 includes a fuel source 34. The fuel source 34 is any suitable container or vessel adapted to store a volume of fuel. The fuel within the fuel source 34 can have various states. As a non-limiting example, the fuel within the fuel source 34 can be a solid, a liquid, or a gas. The fuel source 34 is provided exterior the engine casing 29. The fuel source 34 can be provided exterior the turbine engine 10. As a non-limiting example, the turbine engine 10 can be coupled to an aircraft having a wing. The wing can include the fuel source 34. The fuel source 34 is configured to feed a flow of the fuel to the combustion section 14, specifically the combustor 30. While only a single fuel source 34 is illustrated, it will be appreciated that the turbine engine 10 can include or otherwise be coupled to any number of one or more fuel sources having any number of one or more types of fuel.

During operation of the turbine engine 10, ambient or atmospheric air is drawn into the compressor section 12 via a fan section (not illustrated) upstream of the compressor section 12, where the air is compressed defining a pressurized air. At least a portion of the pressurized air then flows into the combustion section 14 where the pressurized air is mixed with fuel from the fuel source 34 and ignited, thereby generating combustion gases. Some work is extracted from these combustion gases by the turbine section 16, which in turn drives the compressor section 12 and the fan section through the drive shaft 18. The combustion gases are ultimately discharged from the turbine engine 10 via an exhaust section (not illustrated) downstream of the turbine section 16. The pressurized air flow and the combustion gases can together define a working air flow that flows through the compressor section 12, the combustion section 14, and the turbine section 16 of the turbine engine 10.

Figure 2:
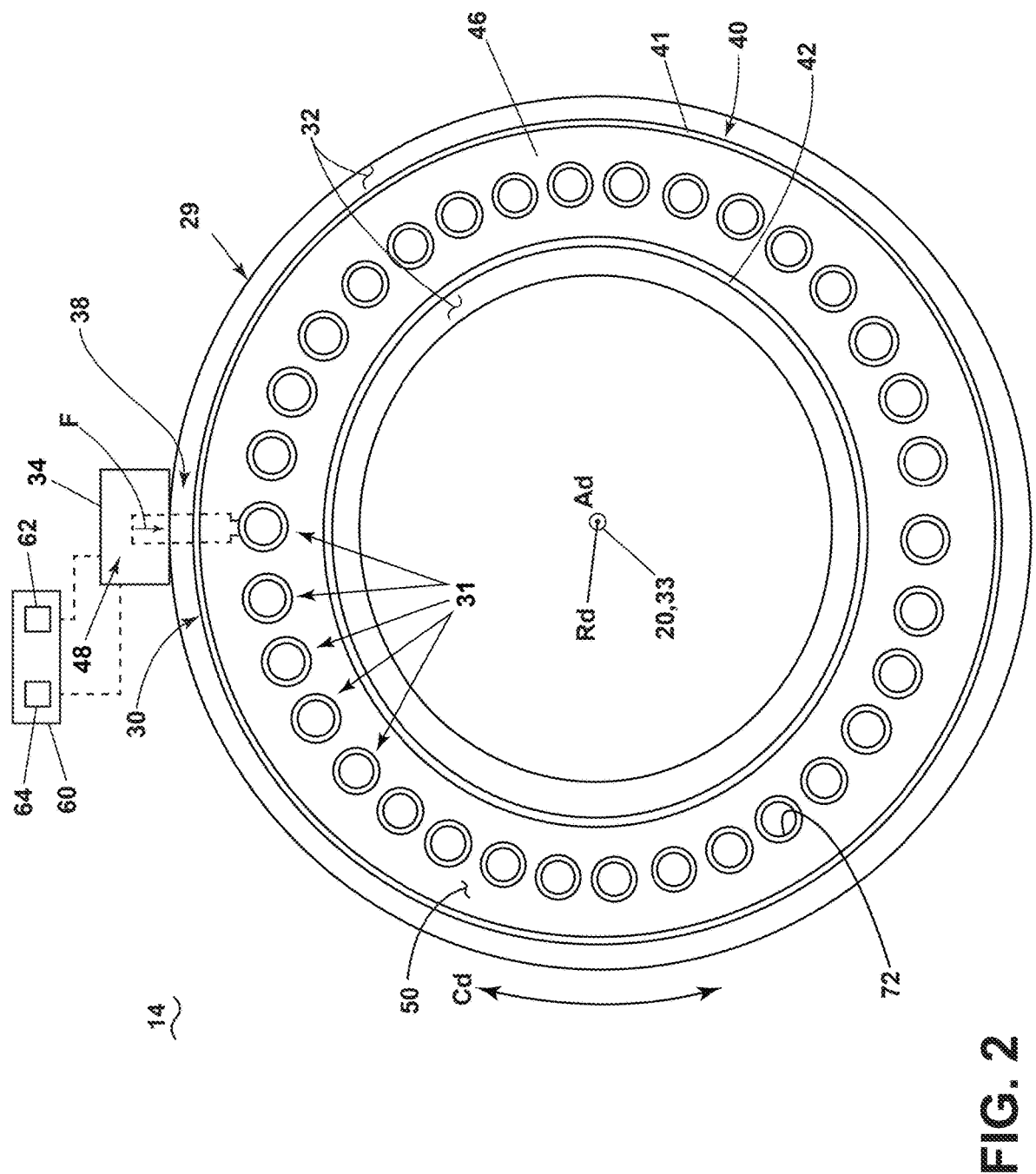
FIG. 2 is a schematic view of the combustion section of FIG. 1 along line II-II in accordance with various aspects described herein.

FIG. 2 depicts a cross-sectional view of the combustion section 14 along line II-II of FIG. 1. The combustor 30 can have a can, can-annular, or annular arrangement depending on the type of engine in which the combustor 30 is located. In a non-limiting example, the combustor 30 can have a combination arrangement located with the engine casing 29. The engine casing 29 can enshroud or cover at least a portion of the combustion section 14. The combustion section 14 includes a combustion section centerline 33. The combustion section 14 can be collinear with the rotational axis 20 such that the combustion section centerline 33 extends along the rotational axis 20. Alternatively, at least a portion of the combustion section centerline 33 can be offset from the rotational axis 20. The combustion section centerline 33 defines a radial direction Rd, an axial direction Ad, and a circumferential direction Cd.

The combustor 30 includes a combustor liner 40. The combustor liner 40 can include an outer combustor liner 41 and an inner combustor liner 42 concentric with respect to each other and arranged in an annular fashion about the engine centerline or rotational axis 20. The combustor liner 40 can have various configurations. As a non-limiting example, the combustor liner 40 can extend continuously about an entirety of a circumferential extent of the combustion section centerline 33 in the circumferential direction Cd. As a non-limiting example, the combustor liner 40 can extend continuously about less than the entirety of the circumferential extent of the combustion section centerline 33 in the circumferential direction Cd. As a non-limiting example, the combustor liner 40 can be segmented (e.g., formed of two or more bodies coupled to one another) in the circumferential direction Cd, the axial direction Ad, the radial direction Rd, or a combination thereof. As a non-limiting example, the combustor liner 40 can include two or more circumferential segments, with each segment of the two or more circumferential segments extending circumferentially about less than the entirety of the circumferential extent of the combustion section centerline 33 in the circumferential direction Cd. The two or more circumferential segments, when coupled to each other, will collectively extend about the entirety of the circumferential extent of the combustion section centerline 33 in the circumferential direction Cd.

The combustor 30 can include a dome wall 46 interconnecting opposing portions of the combustor liner 40. As a non-limiting example, the dome wall 46 can extend radially between the outer combustor liner 41 and the inner combustor liner 42. The dome wall 46 can be formed substantially perpendicular to the combustion section centerline 33. The dome wall 46, like the combustor liner 40, can extend continuously about an entirety of the circumferential extent of the combustion section centerline 33 in the circumferential direction Cd. Alternatively, the dome wall 46 can be segmented in the circumferential direction Cd, the radial direction Rd, or a combination thereof.

At least one of the dome wall 46 or the combustor liner 40 includes a set of fuel nozzle openings 72. As illustrated, the dome wall 46 includes the set of fuel nozzle openings 72. It will be appreciated, however, that at least one fuel nozzle opening of the set of fuel nozzle openings 72 can be located along a respective portion of the combustor liner 40.

It will be appreciated that in some configurations, the dome wall 46 can be excluded from the combustor 30. In such a configuration, the inner combustor liner 42 and the outer combustor liner 41 can meet at a common point. The dome wall 46 and the combustor liner 40 will be collectively referred to as a "wall" that defines a combustion chamber 50.

The combustor liner 40 and the dome wall 46 (if included) collectively form the combustion chamber 50. The combustion chamber 50 is arranged annularly about the combustion section centerline 33 in the circumferential direction Cd.

A compressed air passage 32 can be defined at least in part by both the combustor liner 40 and the engine casing 29. As a non-limiting example, the combustor liner 40 is spaced from the engine casing 29 to define the compressed air passage 32 therebetween. The compressed air passage 32 is fluidly coupled to the compressor section 12 (FIG. 1).

The combustion section 14 can include an annular arrangement of combustor portions 31 disposed around the centerline or rotational axis 20 of the turbine engine 10 in the circumferential direction Cd. It will be appreciated that one or more combustor portion of the annular arrangement of combustor portions 31 can be radially or axially offset in the radial direction Rd or axial direction Ad, respectively. The combustor portions 31 can, in some configurations, include or be configured as combustor cups, fuel cups, or nozzle cups.

Each combustor portion of the annular arrangement of combustor portions 31 includes a fuel nozzle 48. For purposes of illustration, only a singular fuel nozzle 48 is shown, however, it will be appreciated that each combustor portion of the annular arrangement of combustor portions 31 can include a respective fuel nozzle 48. Each fuel nozzle 48 includes a fuel nozzle body 38 that extends through a respective one fuel nozzle opening of the set of fuel nozzle openings 72.

During operation, a fuel F is fed from the fuel source 34 and to the combustion chamber 50 through the annular array of combustor portions 31. Specifically, the fuel F is fed to the combustion chamber 50 through the fuel nozzle body 38 of at least one combustor portion of the annular array of combustor portions 31. The fuel F includes any suitable fuel, including gaseous fuel, such as $H_2$ fuel. As a non-limiting example, the fuel F can include 100% $H_2$ (e.g., without diluents). In some examples, the fuel F can be a combination of fuels using other fuels with $H_2$ fuels. For example, the fuel F can comprise $H_2$ fuel and methane, such as in the form of natural gas. A controller 60 can be connected to and at least partially control operation of the fuel source 34, the fuel nozzle 48, or both. The controller 60 can include a processor 62 and a memory 64.

Figure 3:
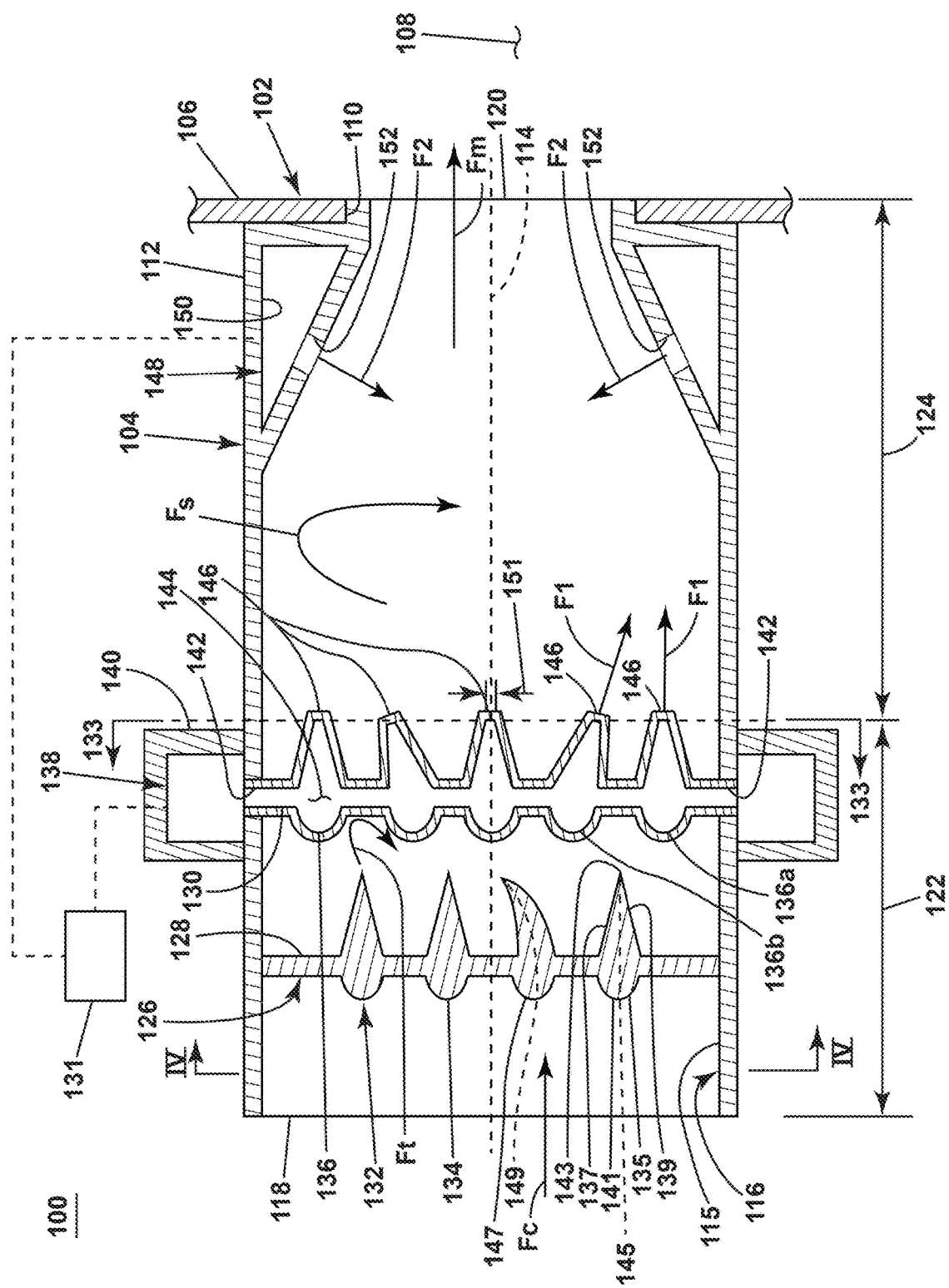
FIG. 3 is a schematic illustration of a combustion section suitable for use within the turbine of FIG. 1, further illustrating a fuel nozzle having a support matrix with a first stage and a second stage, and a set of vortex generators located on the support matrix.

FIG. 3 is a schematic illustration of a combustor portion 100 suitable for use within the turbine engine 10 of FIG. 1. The combustor portion 100 is similar to the combustor portion 31 (FIG. 2); therefore, like parts will be identified with like names with it being understood that the description of the combustor portion 31 applies to the combustor portion 100 unless noted otherwise.

The combustor portion 100 includes a combustor 102 and a fuel nozzle 104. The combustor 102 includes a combustor wall 106. The combustor wall 106 includes a fuel nozzle opening 110. The combustor wall 106 at least partially defines a combustion chamber 108. The combustor wall 106 can be various walls within the combustor 102 such as a dome wall (e.g., the dome wall 46 of FIG. 2), a combustor liner (e.g., the combustor liner 40 of FIG. 2, the inner combustor liner 42 of FIG. 2, the outer combustor liner 41 of FIG. 2, or a combination thereof), or a combination thereof that at least partially defines the combustion chamber 108.

The fuel nozzle 104 includes a fuel nozzle body 112. The fuel nozzle body 112 defines a fuel nozzle axis 114. The fuel nozzle axis 114 extends through a center of the fuel nozzle body 112. The fuel nozzle body 112 can be symmetrical or asymmetrical about the fuel nozzle axis 114. The fuel nozzle body 112 has a channel 116 defined by a fuel nozzle inner surface 115. The channel 116 extends axially with respect to the fuel nozzle axis 114 between a fuel nozzle inlet 118 and a fuel nozzle outlet 120. The fuel nozzle inlet 118 is formed as at least one of a channel, a slot, a set of holes, or a combination thereof extending through a respective portion of the fuel nozzle body 112. The fuel nozzle body 112 opens to the combustion chamber 108 at the fuel nozzle outlet 120.

The channel 116 is split into at least two sections; a compressed air flow passage 122 and a mixer 124. The compressed air flow passage 122 extends axially with respect to the fuel nozzle axis 114 from the fuel nozzle inlet 118 to the mixer 124. The mixer 124 extends axially with respect to the fuel nozzle axis 114 from the compressed air flow passage 122 to the fuel nozzle outlet 120. Further delineation between the compressed air flow passage 122 and the mixer 124 with respect to flows of fluids within the compressed air flow passage 122 and the mixer 124 will be described in further detail below.

The fuel nozzle 104 includes a support matrix 126 within the channel 116. The support matrix 126 includes a plurality of stages including at least a first stage 128 and a second stage 130. The first stage 128 is located axially forward of the second stage 130 with respect to the fuel nozzle axis 114. The support matrix 126 can include various numbers of stages such as a single stage or any number of two or more stages.

The fuel nozzle 104 includes a set of vortex generators 132. Each vortex generator of the set of vortex generators 132 is suspended within the channel 116 by the support matrix 126. That is, each vortex generator of the set of vortex generators 132 is located along a respective portion of support matrix 126.

A subset of the set of vortex generators 132 is located along the first stage 128. The subset of the set of vortex generators 132 located along the first stage 128 is referred to herein as a subset of first stage vortex generators 134. The subset of first stage vortex generators 134 can include any number of vortex generators of the set of vortex generators 132. For example, the subset of first stage vortex generators 134 can include at least one vortex generator of the set of vortex generators 132. Another subset of the set of vortex generators 132 is located along the second stage 130. The subset of the set of vortex generators 132 located along the second stage 130 is referred to herein as a subset of second stage vortex generators 136. The subset of second stage vortex generators 136 can include any number of vortex generators of the set of vortex generators 132. For example, the subset of second stage vortex generators 136 can include at least one vortex generator of the set of vortex generators 132. The subset of first stage vortex generators 134 is radially offset from the subset of second stage vortex generator 136 with respect to the fuel nozzle axis 114. That is, the subset of first stage vortex generators 134 is located at a radial position that is different from a radial position of the subset of second stage vortex generators 136.

In a non-limiting example, the set of vortex generators 132 can have a cross-section in the shape of a symmetrical airfoil. For example, a vortex generator 135 of the set of vortex generators 132 is symmetrical airfoil shaped and includes a pressure side 137 and a suction side 139 which each extend between a leading edge 141 and a trailing edge 143. A chord line 145 extends through the vortex generator 135 between the leading edge 141 and the trailing edge 143. The chord line 145 forms a line of symmetry through the vortex generator 135, which gives the symmetrical airfoil shape of the vortex generator 135. However, other cross-sectional shapes of the set of vortex generators 132 are contemplated including any shapes that improve mixedness, vorticity, or turbulent kinetic energy such as (but not limited to) an asymmetrical airfoil (e.g., a vortex generator 147, which is asymmetrical about a chord line 149), a triangle, a delta wing, a wishbone, a circle, or a combination thereof. In the illustrated non-limiting example, each vortex generator of the set of vortex generators 132 has an airfoil shaped cross-section which tapers towards the fuel nozzle outlet 120. The set of vortex generators 132 can be oriented parallel with the fuel nozzle axis 114 (e.g., a vortex generator 136*a*) or can be angled with respect to the fuel nozzle axis 114 (e.g., a vortex generator 136*b*), or a combination thereof. That is, a portion of the set of vortex generators 132 can be oriented parallel with the fuel nozzle axis 114 and a portion of the set of vortex generators 132 can be angled either inward or outward with respect to the fuel nozzle axis 114.

The fuel nozzle 104 includes a flow area and an obstructed area when viewed along a plane 133 that is perpendicular to the fuel nozzle axis 114 and at an axial position with respect to the fuel nozzle axis 114 of a farthest downstream vortex generator of the set of vortex generators 132. The flow area is defined as a portion of a total cross-sectional area of the channel 116 along the plane 133 that is left open or otherwise not obstructed by the support matrix 126 and the set of vortex generators 132. The obstructed area is defined as a portion of the total cross-sectional area of the channel 116 along the plane 133 that is obstructed by the support matrix 126 and the set of vortex generators 132. A summation of the flow area and the obstructed area when viewed along the plane 133 is the total cross-sectional area of the channel 116 along the plane 133. The flow area is greater than or equal to 40% and less than or equal to 80% of the total cross-sectional area of the channel 116 along the plane 133.

The fuel nozzle 104 includes at least one of a first fuel supply 138, a second fuel supply 148, or a combination thereof. The first fuel supply 138 and the second fuel supply 148 are each fluidly coupled with a fuel source 131 (e.g., the fuel source 34, FIG. 1). The fuel source 131 is exterior to the fuel nozzle body 112. The first fuel supply 138 and the second fuel supply 148 are fluidly coupled to the fuel source 131 by a series of tubes, conduits, passageways, or a combination thereof shown in phantom lines.

The first fuel supply 138 includes a first fuel plenum 140, a set of fuel inlet orifices 142, a first fuel passage 144, and a set of first fuel outlet orifices 146. The set of fuel inlet orifices 142 interconnects the first fuel plenum 140 and the first fuel passage 144. The first fuel passage 144 interconnects the set of fuel inlet orifices 142 to the set of first fuel outlet orifices 146. The first fuel passage 144 opens to the channel 116 at the set of first fuel outlet orifices 146.

The first fuel plenum 140 is defined as a distribution channel that distributes fuel received from the fuel source 131. The first fuel plenum 140 is at least partially formed by the fuel nozzle body 112. As a non-limiting example, the first fuel plenum 140 can be integrally formed with the fuel nozzle body 112.

The set of fuel inlet orifices 142 are each defined by a passageway, as illustrated, or alternatively a hole formed within and along a respective portion of the fuel nozzle body 112. While only two fuel inlet orifices of the set of fuel inlet orifices 142 are illustrated, the set of fuel inlet orifices 142 can include any number of one or more fuel inlet orifices.

The first fuel passage 144 extends from the first fuel plenum 140 and into a respective portion of the support matrix 126 and a respective portion of the set of vortex generators 132. Particularly, the first fuel passage 144 extends through a stage of the support matrix 126 that is closest to the combustion chamber 108 and the vortex generators of the set of vortex generators 132 that are located along the stage of the support matrix 126 that is closest to the combustion chamber 108. In a non-limiting example, the first fuel passage 144 extends through the second stage 130 of the support matrix 126 and the subset of second stage vortex generators 136. The first fuel passage 144 opens to the set of first fuel outlet orifices 146 provided along at least a portion of the subset of second stage vortex generators 136. In some examples, the set of first fuel outlet orifices 146 is only located on a respective portion of the subset of second stage vortex generators 136. It is contemplated that in other non-limiting examples, the first fuel passage 144 can additionally or alternatively extend through another stage of the support matrix 126. That is, the first fuel passage 144 can optionally also extend through the first stage 128 and the subset of first stage vortex generators 134. In such a configuration, the set of first fuel outlet orifices 146 is additionally or alternatively located on the subset of first stage vortex generators 134.

Each first fuel outlet orifice of the set of first fuel outlet orifices 146 is defined by a passageway, as illustrated, or alternatively a hole formed within and along a respective portion of the set of vortex generators 132. A hydraulic diameter 151 of each first fuel outlet orifice of the set of first fuel outlet orifices 146 can be in a range from greater than or equal to 6 milli inches (mils) and less than or equal to 100 mils.

The second fuel supply 148 includes a second fuel plenum 150, and a set of second fuel outlet orifices 152. The second fuel supply 148 opens to the channel 116 at the set of second fuel outlet orifices 152. Each second fuel outlet orifice of the set of second fuel outlet orifices 152 is defined by a passageway, as illustrated, or alternatively a hole formed within and along a respective portion of the second fuel plenum 150 formed by the fuel nozzle body 112.

The second fuel plenum 150 is defined as a distribution channel that distributes a fuel received from the fuel source 131. The second fuel plenum 150 is at least partially formed by the fuel nozzle body 112. As a non-limiting example, the second fuel plenum 150 can be integrally formed with the fuel nozzle body 112 downstream of the support matrix 126 and the set of vortex generators 132.

During operation, a compressed air flow Fc is fed to the channel 116. Specifically, the compressed air flow Fc is fed to the compressed air flow passage 122 through the fuel nozzle inlet 118. As such, it will be appreciated that the compressed air flow passage 122 is defined as a region of the channel 116 absent a flow of fuel but including the compressed air flow Fc. The compressed air flow Fc is a flow of compressed air from an upstream portion of a turbine engine (e.g., the turbine engine 10 of FIG. 1) such as from a compressor section (e.g., the compressor section 12 of FIG. 1). The compressed air flow Fc has a first pressure.

The compressed air flow Fc flows within the flow area and over the support matrix 126 and the set of vortex generators 132. As the compressed air flow Fc flows over the set of vortex generators 132, the compressed air flow Fc forms a turbulent air flow Ft in the form of vortices or eddies. For the purpose of illustration, the turbulent air flow Ft is shown directly downstream of the first stage 128. However, it will be appreciated that each stage of the support matrix 126 and its corresponding vortex generators of the set of vortex generators 132 generates a respective turbulent air flow Ft. The turbulent air flow Ft forms vortex pairs within the channel 116 by turning both radially and axially with respect to the fuel nozzle axis 114.

Further, if at least a subset of the set of vortex generators 132 is angled inward or outward with respect to the fuel nozzle axis 114, the respective turbulent air flows Ft can collectively swirl downstream of the support matrix 126 and the set of vortex generators 132 forming a swirled air flow Fs. The swirled air flow Fs has a swirl number of greater than or equal to 0.2 and less than or equal to 1.2.

A first flow of fuel F1 can be fed to the channel 116 through the first fuel supply 138. Specifically, the first flow of fuel F1 is exhausted from the set of first fuel outlet orifices 146, which are included at least on the subset of second stage vortex generators 136 and optionally are included on the subset of first stage vortex generators 134. In a non-limiting example, the first flow of fuel F1 is injected in a direction parallel with the fuel nozzle axis 114 (e.g., axially with respect to the fuel nozzle axis 114). That is, a vector of the first flow of fuel F1 is parallel with the fuel nozzle axis 114. Additionally or alternatively, the first flow of fuel F1 is injected at an angle with respect to the fuel nozzle axis 114. That is, a vector of the first flow of fuel F1 is non-parallel with the fuel nozzle axis 114. The first flow of fuel F1 has a second pressure, with the second pressure being greater than or equal to 1.01 times and less than or equal to 1.5 times the first pressure of the compressed air flow Fc. A second flow of fuel F2 can be fed to the channel 116 through the second fuel supply 148. It will be appreciated that the fuel nozzle 104 can include at least one of the first flow of fuel F1, the second flow of fuel F2, or a combination thereof. The fuel fed to the channel 116 (e.g., the first flow of fuel F1 and the second flow of fuel F2) will hereinafter be collectively referred to as the flow of fuel. The flow of fuel contains any suitable fuel. As a non-limiting example, the flow of fuel includes a flow of $H_2$ fuel (e.g., 100% gaseous $H_2$ fuel, 100% liquid $H_2$ fuel, or $H_2$ fuel mixed with another fuel or fluid) or natural gas fuel.

The flow of fuel is fed from the fuel source 131 to the channel 116. Specifically, the flow of fuel is exhausted from the set of first fuel outlet orifices 146, the set of second fuel outlet orifices 152, or a combination thereof into the mixer 124 of the channel 116. As such, the mixer 124 is defined as a region of the channel 116 that includes both the at least one flow of fuel and the compressed air flow Fc (e.g., in the form of the turbulent air flow Ft, the swirled air flow Fs, or a combination thereof). The plurality of first fuel outlet orifices 146 can be oriented such that the first flow of fuel F1 is injected into the mixer 124 axially or parallel with the fuel nozzle axis 114 (e.g., from vortex generator 136a), at an angle with respect to the fuel nozzle axis 114 (e.g., from vortex generator 136b), or a combination thereof. The flow of fuel is mixed with a respective portion of the compressed air flow Fc, specifically the turbulent air flow Ft, the swirled air flow Fs, or a combination thereof, to define a fuel air mixture Fm. The fuel air mixture Fm is fed to the combustion chamber 108 and ignited to define a flame (not illustrated) within the combustion chamber 108.

By distributing the set of vortex generators 132 within the channel 116, turbulence is created in the channel 116 near the fuel nozzle axis 114, which results in decreased flame speed and flashback risk compared to fuel nozzles where turbulence is created near the periphery of the fuel nozzle (e.g., near the fuel nozzle inner surface 115). The set of vortex generators 132 can be particularly oriented with respect to the fuel nozzle axis 114 to control a degree of mixedness of the flow of fuel and the compressed air flow Fc. Particularly, a uniform mixing profile can be achieved by orienting the set of vortex generators 132 away from the fuel nozzle inner surface 115.

The fuel nozzle 104 is especially well suited for use where the flow of fuel contains $H_2$ fuel. As discussed herein, the turbulent air flow Ft ensures a uniform mixture of fuel and air of the fuel air mixture Fm, thus reducing the likelihood of pockets or concentrations of fuel to be formed within the fuel air mixture Fm. As discussed herein, $H_2$ fuels have a higher burn velocity and greater chance for flashback. The elimination of or reduction of the large concentrations of fuel within the fuel air mixture Fm reduces the likelihood of flashback occurring by reducing the locations where the flame can spread.

Figure 4:
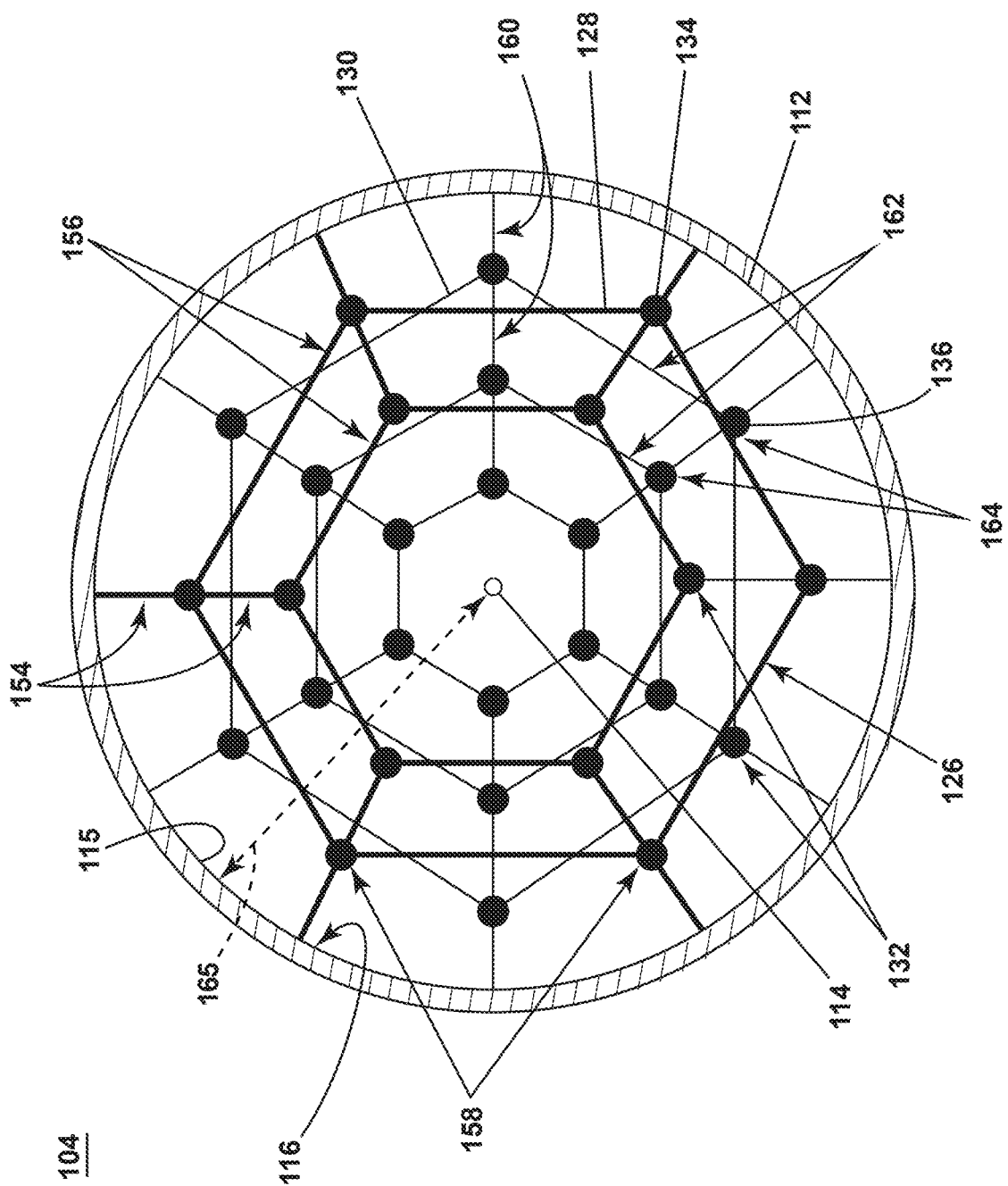
FIG. 4 is a schematic cross-sectional forward looking aft view along line IV-IV of FIG. 3 depicting segments of the first stage of the support matrix forming a web shape and segments of the second stage of the support matrix forming a web shape.

FIG. 4 is a cross-sectional view of the combustor portion 100 from the line IV-IV in FIG. 3. The fuel nozzle 104 includes a support matrix 126 with a first stage 128 and a second stage 130. For purposes of illustration, the first stage 128 and the second stage 130 are shown with varying line thicknesses. The first stage 128 includes a plurality of segments that are illustrated in thick lines. The second stage 130 includes a plurality of segments that are illustrated in thin lines. Both the first stage 128 and the second stage 130 have a spider web shape, referred to herein simply as a web shape, which will be described in more detail below.

The plurality of segments of the first stage 128 includes a set of first radial segments 154 and a set of first viscid segments 156. The set of first radial segments 154 extend radially with respect to the fuel nozzle axis 114. Each first viscid segment of the set of first viscid segments 156 interconnects two radial segments of the set of first radial segments 154. The set of first radial segments 154 meets the set of first viscid segments 156 at a set of first local junctions 158. Each first radial segment of the set of first radial segments 154 and each first viscid segment of the set of first viscid segments 156 is illustrated as linear. However, it is contemplated that the set of first radial segments 154 and the set of first viscid segments 156 can be linear, curved, or a combination thereof. For example, the set of first viscid segments 156 can each be curved, collectively forming circle or oval shapes.

At least a majority of vortex generators included in the subset of first stage vortex generators 134 are located along the first stage 128 at the set of first local junctions 158. That is, at least half of the total number of first local junctions of the set of first local junctions 158 includes a first stage vortex generator of the subset of first stage vortex generators 134 located thereon. In a non-limiting example, a respective first stage vortex generator of the subset of first stage vortex generators 134 is located at each first local junction of the set of first local junctions 158. Additionally or alternatively, some or all of the subset of first stage vortex generators 134 can be located along the set of first radial segments 154, the set of first viscid segments 156, or a combination thereof.

The second stage 130 has a similar shape to the first stage 128. That is, the second stage 130 includes a plurality of segments illustrated in thin lines that includes a set of second radial segments 160 and a set of second viscid segments 162. The set of second radial segments 160 extend radially with respect to the fuel nozzle axis 114. Each second viscid segment of the set of second viscid segments 162 interconnects two radial segments of the set of second radial segments 160. The set of second radial segments 160 meets the set of second viscid segments 162 at a set of second local junctions 164. Each second radial segment of the set of second radial segments 160 and each second viscid segment of the set of second viscid segments 162 is illustrated as linear. However, it is contemplated that the set of second radial segments 160 and the set of second viscid segments 162 can be linear, curved, or a combination thereof. For example, the set of second viscid segments 162 can each be curved, collectively forming circle or oval shapes.

At least a majority of vortex generators included in the subset of second stage vortex generators 136 are located along the second stage 130 at the set of second local junctions 164. That is, at least half of the total number of second local junctions of the set of second local junctions 164 includes a second stage vortex generator of the subset of second stage vortex generators 136 located thereon. In a non-limiting example, a second stage vortex generator of the subset of second stage vortex generators 136 is located at each second local junction of the set of second local junctions 164. Additionally or alternatively, some or all of the second stage vortex generators of the subset of second stage vortex generators 136 can be located along the set of second radial segments 160, the set of second viscid segments 162, or a combination thereof.

When viewed along the plane 133 (FIG. 3), the set of first radial segments 154 intersect the set of second radial segments 160, the set of second viscid segments 162, or a combination thereof. Additionally, the set of second radial segments 160 intersect the set of first radial segments 154, the set of first viscid segments 156, or a combination thereof. As the first stage 128 is axially separated from the second stage 130 with respect to the fuel nozzle axis 114, the plurality of segments of the first stage 128 including the set of first radial segments 154 and the set of first viscid segments 156 does not physically contact the plurality of segments of the second stage 130 including the set of second radial segments 160 and the set of second viscid segments 162. However, as used in the above context, "intersect when viewed along the plane 133 (FIG. 3)" does not require that two components (e.g. any one of the plurality of segments of the first stage 128 and any one of the plurality of segments of the second stage 130) physically contact each other; rather, "intersects" as used in the above context requires that the two components visually appear to axially overlap each other when viewed along a plane (e.g., the plane 133 of FIG. 3) that is perpendicular to the fuel nozzle axis 114

The first stage 128 and the second stage 130 are oriented such that the set of first local junctions 158 is circumferentially offset from the set of second local junctions 164. That is, the set of first local junctions 158 does not axially overlap with the set of second local junctions 164 with respect to the fuel nozzle axis 114. Accordingly, since the subset of first stage vortex generators 134 and the subset of second stage vortex generators 136 are located on the set of first local junctions 158 and the set of second local junctions 164, respectively, the subset of first stage vortex generators 134 are axially and radially spaced from the subset of second stage vortex generators 136 with respect to the fuel nozzle axis 114.

The fuel nozzle 104 defines a radial distance 165 from the fuel nozzle axis 114 to the fuel nozzle inner surface 115. Each vortex generator of the set of vortex generators 132 is located in a region of the channel 116 that extends to less than or equal to 80% of the radial distance 165 with 0% of the radial distance 165 being the fuel nozzle axis 114 and 100% of the radial distance 165 being the fuel nozzle inner surface 115. For example, each vortex generator of the set of vortex generators 132 is located in a region of the channel 116 that extends from greater than or equal to 10% of the radial distance 165 and less than or equal to 80% of the radial distance 165.

By locating the set of vortex generators 132 within a region of the channel 116 away from the fuel nozzle inner surface 115, mixing of the first flow of fuel F1 (FIG. 3) and the compressed air flow Fc (FIG. 3) occurs near the fuel nozzle axis 114. Thus, a uniform mixing profile of the fuel air mixture Fm (FIG. 3) is achieved, and the risks of flashback and flame holding are reduced compared to conventional fuel nozzles where mixing of fuel and air occurs near inner surfaces of the fuel nozzle.

Figure 5:
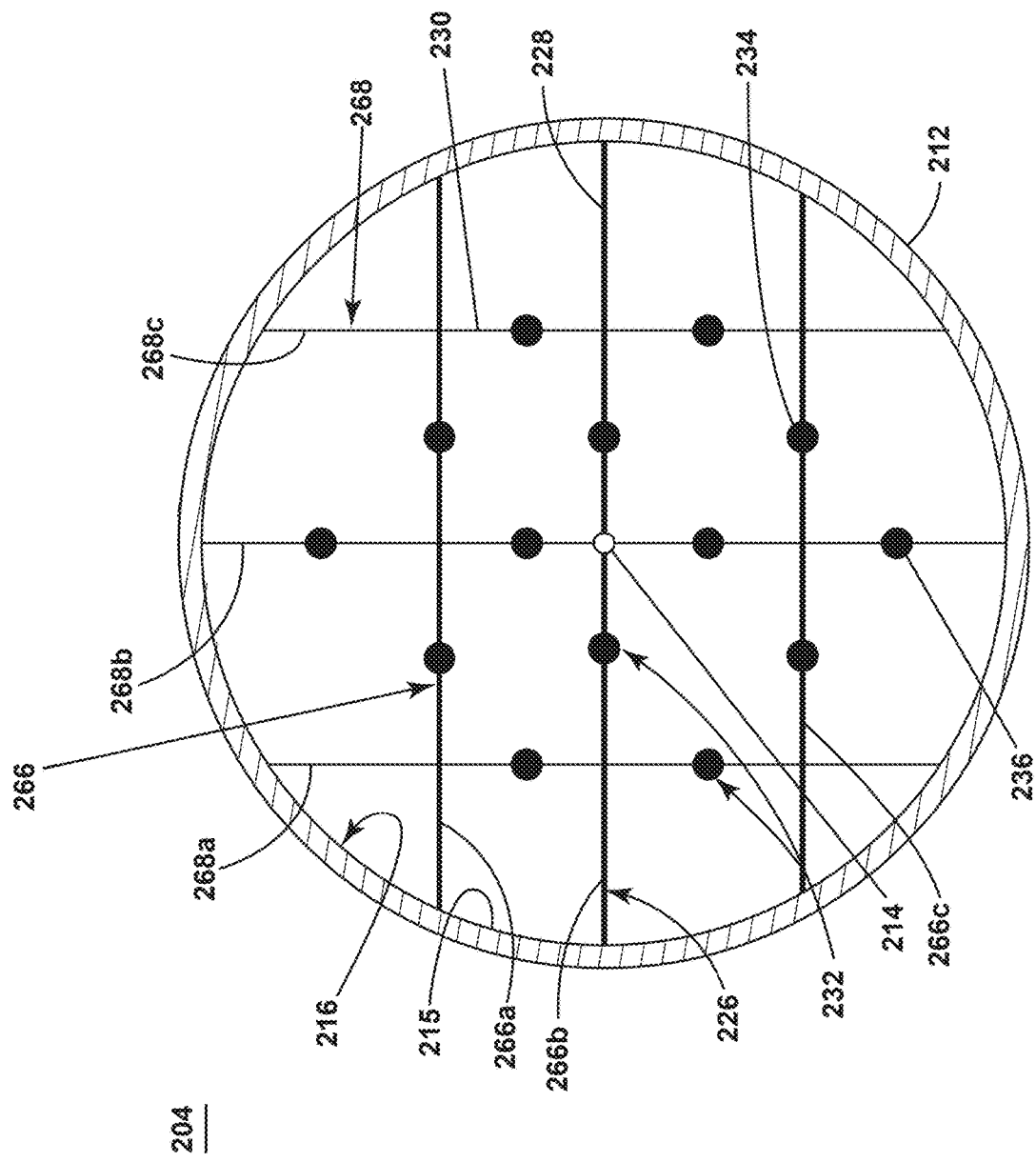
FIG. 5 is a schematic cross-sectional forward looking aft view of an exemplary fuel nozzle suitable for use as the fuel nozzle of FIG. 3, further illustrating a support matrix with non-intersecting segments of a first stage and non-intersecting segments of a second stage, and a set of vortex generators.

FIG. 5 is a schematic cross-sectional forward looking aft view of an exemplary fuel nozzle 204 suitable for use as the fuel nozzle 104 of FIG. 3. The fuel nozzle 204 is similar to the fuel nozzle 104 (FIGS. 3-4), therefore, like parts will be identified with like numerals increased to the 200 series with it being understood that the description of the fuel nozzle 104 applies to the fuel nozzle 204 unless noted otherwise.

The fuel nozzle 204 includes a fuel nozzle body 212. The fuel nozzle body 212 defines a fuel nozzle axis 214. The fuel nozzle body 212 has a channel 216 defined by a fuel nozzle inner surface 215. The fuel nozzle 204 includes a support matrix 226 within the channel 216. The support matrix 226 includes a plurality of stages including at least a first stage 228 and a second stage 230. The first stage 228 is located axially forward of the second stage 230 with respect to the fuel nozzle axis 214. For purposes of illustration, the first stage 228 and the second stage 230 are shown with varying line thicknesses. The fuel nozzle 204 includes a set of vortex generators 232. Each vortex generator of the set of vortex generators 232 is suspended within the channel 216 by the support matrix 226.

The fuel nozzle 204 is similar to the fuel nozzle 104 (FIG. 3) in that the first stage 228 and the second stage 230 form an overlapping pattern when viewed along a plane (e.g., the plane 133 of FIG. 3) that is perpendicular to the fuel nozzle axis 214 at an axial position with respect to the fuel nozzle axis 214 of a farthest downstream vortex generator of the set of vortex generators 232. The overlapping pattern, however, is formed as a rectangular grid pattern as opposed to the web pattern formed by the support matrix 126 of FIG. 4.

The first stage 228 includes a set of first segments 266. In the illustrated non-limiting example, the set of first segments 266 includes three first segments 266a, 266b, and 266c. However, it is contemplated that the set of first segments 266 can include any number of segments including one segment. Each first segment of the set of first segments 266 is illustrated as linear. However, it is contemplated that the set of first segments 266 can be linear, curved, or a combination thereof. The first segments 266a, 266b, 266c are illustrated as parallel to one another. However, it is contemplated that the set of first segments 266 can include segments or portions of segments that are parallel, or non-parallel to one another provided that they do not intersect with each other.

The second stage 230 includes a set of second segments 268. In the illustrated non-limiting example, the set of second segments 268 includes three second segments 268a, 268b, and 268c. However, it is contemplated that the set of second segments 268 include any number of segments including one segment. Each second segment of the set of second segments 268 is illustrated as linear. However, it is contemplated that the set of second segments 268 can be linear, curved, or a combination thereof. The second segments 268a, 268b, 268c are illustrated as parallel to one another. However, it is contemplated that in all examples, the set of second segments 268 are non-intersecting with each other. That is, no segment of the set of second segments 268 intersects another segment of the set of second segments 268. However, it is contemplated the set of second segments 268 can include segments or portions of segments that are parallel, or non-parallel to one another provided that they do not intersect with each other.

When viewed along a plane (e.g., the plane 133 of FIG. 3) that is perpendicular to the fuel nozzle axis 214 at an axial position with respect to the fuel nozzle axis 214 of a farthest downstream vortex generator of the set of vortex generators 232, the set of first segments 266 intersects the set of second segments 268. That is, segments of the first stage 228 intersect segments of the second stage 230 when viewed along a plane (e.g., the plane 133 of FIG. 3) that is perpendicular to the fuel nozzle axis 214 at an axial position with respect to the fuel nozzle axis 214 of a furthest downstream vortex generator of the set of vortex generators 232, thereby forming the support matrix 226. In some examples, the set of first segments 266 is perpendicular to the set of second segments 268. As the first stage 228 is axially separated from the second stage 230 with respect to the fuel nozzle axis 214, the set of first segments 266 does not physically contact the set of second segments 268. However, as used in the above context, "intersect when viewed along a plane (e.g. the plane 133 of FIG. 3)" does not require that two components (e.g. the set of first segments 266 and the set of second segments 268) physically contact each other; rather, "intersects" as used in the above context requires that the two components visually appear to axially overlap each other when viewed along a plane (e.g., the plane 133 of FIG. 3) that is perpendicular to the fuel nozzle axis 214.

A subset of the set of vortex generators 232 located along the first stage 228 is referred to herein as a subset of first stage vortex generators 234. Another subset of the set of vortex generators 232 located along the second stage 230 is referred to herein as a subset of second stage vortex generators 236. The subset of first stage vortex generators 234 are located on the first stage 228 such that they do not intersect segments of the second stage 230 when viewed along a plane (e.g., the plane 133 of FIG. 3) that is perpendicular to the fuel nozzle axis 214 at an axial position with respect to the fuel nozzle axis 214 of a farthest downstream vortex generator of the set of vortex generators 232. The subset of second stage vortex generators 236 are located on the second stage 230 such that they do not intersect segments of the first stage 228 when viewed along a plane (e.g., the plane 133 of FIG. 3) that is perpendicular to the fuel nozzle axis 214 and intersecting a furthest downstream vortex generator of the set of vortex generators 232.

Figure 6:
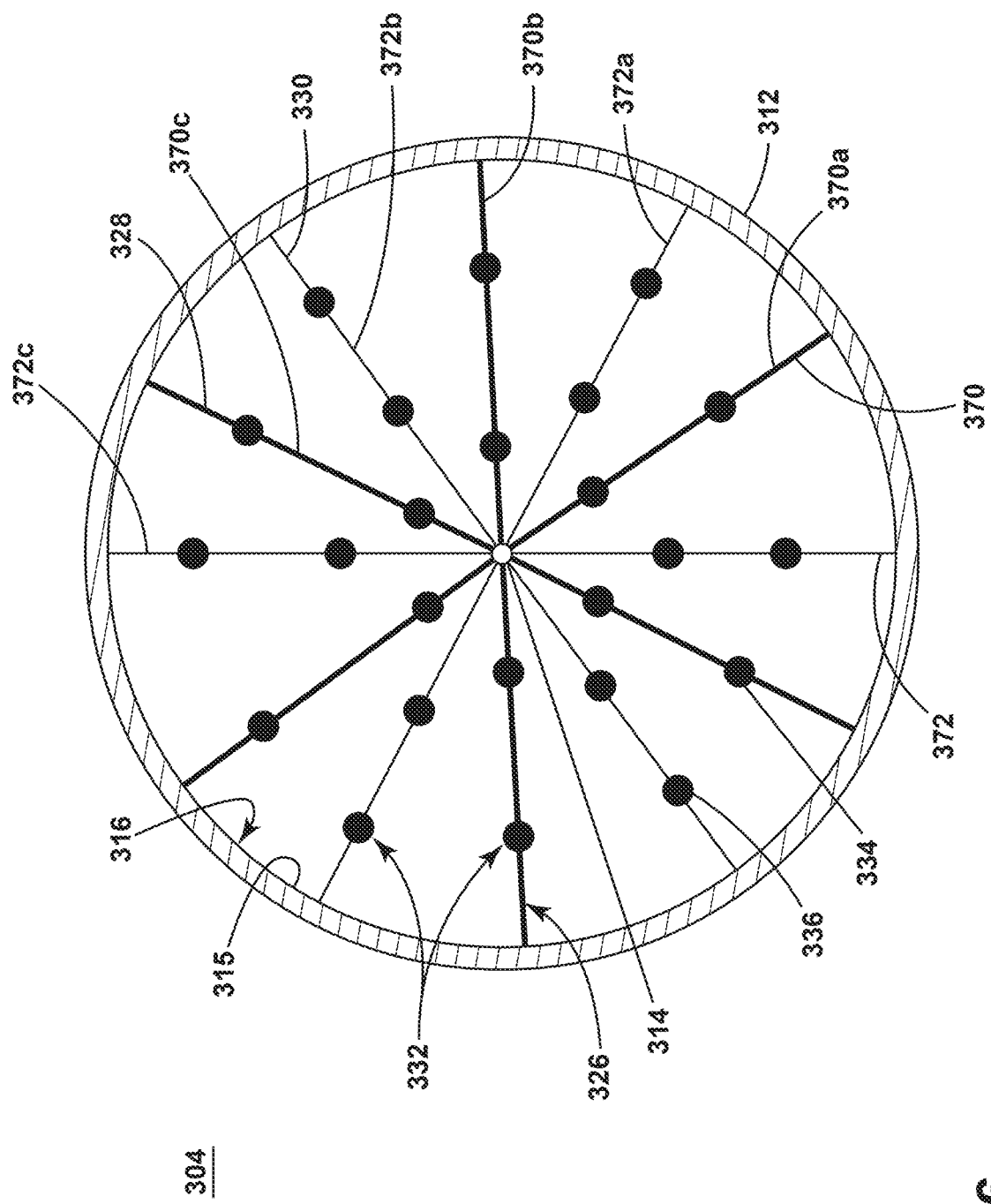
FIG. 6 is a schematic cross-sectional forward looking aft view of an exemplary fuel nozzle suitable for use as the fuel nozzle of FIG. 3, further illustrating a support matrix with segments of a first stage forming a spoked wheel shape and segments of a second stage forming a spoked wheel shape, and a set of vortex generators.

FIG. 6 is a schematic cross-sectional forward looking aft view an exemplary fuel nozzle 304 suitable for use as the fuel nozzle 104 of FIG. 3. The fuel nozzle 304 is similar to the fuel nozzle 104 (FIGS. 3-4), 204 (FIG. 5) therefore, like parts will be identified with like numerals increased to the 300 series with it being understood that the description of the fuel nozzle 104, 204 applies to the fuel nozzle 304 unless noted otherwise.

The fuel nozzle 304 includes a fuel nozzle body 312. The fuel nozzle body 312 defines a fuel nozzle axis 314. The fuel nozzle body 312 has a channel 316 defined by a fuel nozzle inner surface 315. The fuel nozzle 304 includes a support matrix 326 within the channel 316. The support matrix 326 includes a plurality of stages including at least a first stage 328 and a second stage 330. The first stage 328 is located axially forward of the second stage 330 with respect to the fuel nozzle axis 314. For purposes of illustration, the first stage 328 and the second stage 330 are shown with varying line thicknesses. The fuel nozzle 304 includes a set of vortex generators 332. Each vortex generator of the set of vortex generators 332 is suspended within the channel 316 by the support matrix 326.

The fuel nozzle 304 is similar to the fuel nozzle 104 (FIG. 3) in that the first stage 328 and the second stage 330 form an overlapping pattern when viewed along a plane (e.g., the plane 133 of FIG. 3) that is perpendicular to the fuel nozzle axis 314 at an axial position with respect to the fuel nozzle axis 314 of a farthest downstream vortex generator of the set of vortex generators 332. The overlapping pattern, however, is formed at the fuel nozzle axis 314 and the support matrix 326 forms a spoked wheel pattern, as opposed to the web pattern formed by the support matrix 126 of FIG. 4.

The first stage 328 includes a set of first segments 370. In the illustrated non-limiting example, the set of first segments 370 includes three first segments 370a, 370b, and 370c, that are each linear and extend across an entire diameter of the channel 316 defined by the fuel nozzle inner surface 315 through the fuel nozzle axis 314. Although three first segments 370a, 370b, 370c of the set of first segments 370 are illustrated, it is contemplated that the set of first segments 370 can include any number of segments including one segment. Additionally or alternatively, the set of first segments 370 can include segments that extend radially outward from the fuel nozzle axis 314, but do not extend across an entire diameter of the fuel nozzle inner surface 315 (e.g., extending from the fuel nozzle axis 314 across a radius of the channel 316 defined by the fuel nozzle inner surface 315). Additionally or alternatively still, the set of first segments 370 can be linear, curved, or a combination thereof.

The second stage 330 includes a set of second segments 372. In the illustrated non-limiting example, the set of second segments 372 includes three second segments 372a, 372b, and 372c, that are each linear and extend across an entire diameter of the channel 316 defined by the fuel nozzle inner surface 315 through the fuel nozzle axis 314. Although three second segments 372a, 372b, 372c of the set of second segments 372 are illustrated, it is contemplated that the set of second segments 372 can include any number of segments including one segment. Additionally or alternatively, the set of second segments 372 can include segments that extend radially outward from the fuel nozzle axis 314, but do not extend across an entire diameter of the fuel nozzle inner surface 315 (e.g., extending from the fuel nozzle axis 314 across a radius of the channel 316 defined by the fuel nozzle inner surface 315). Additionally or alternatively still, the set of second segments 372 can be linear, curved, or a combination thereof.

When viewed along a plane (e.g., the plane 133 of FIG. 3) that is perpendicular to the fuel nozzle axis 314 at an axial position with respect to the fuel nozzle axis 314 of a farthest downstream vortex generator of the set of vortex generators 332, the set of first segments 370 intersects the set of second segments 372 at the fuel nozzle axis 314. That is, segments of the first stage 328 intersect segments of the second stage 330 at least at the fuel nozzle axis 314 when viewed along a plane (e.g., the plane 133 of FIG. 3) that is perpendicular to the fuel nozzle axis 314 at an axial position with respect to the fuel nozzle axis 314 of a farthest downstream vortex generator of the set of vortex generators 332, thereby forming the support matrix 326. As the first stage 328 is axially separated from the second stage 330 with respect to the fuel nozzle axis 314, the set of first segments 370 does not physically contact the set of second segments 372. However, as used in the above context, "intersect when viewed along a plane (e.g. the plane 133 of FIG. 3)" does not require that two components (e.g. the set of first segments 370 and the set of second segments 372) physically contact each other; rather, "intersects" as used in the above context requires that the two components visually appear to axially overlap each other when viewed along a plane (e.g., the plane 133 of FIG. 3) that is perpendicular to the fuel nozzle axis 314.

A subset of the set of vortex generators 332 located along the first stage 328 is referred to herein as a subset of first stage vortex generators 334. Another subset of the set of vortex generators 332 located along the second stage 330 is referred to herein as a subset of second stage vortex generators 336. The subset of first stage vortex generators 334 are located on the first stage 328 such that they do not intersect segments of the second stage 330 when viewed along a plane (e.g., the plane 133 of FIG. 3) that is perpendicular to the fuel nozzle axis 314 at an axial position with respect to the fuel nozzle axis 314 of a farthest downstream vortex generator of the set of vortex generators 332. The subset of second stage vortex generators 336 are located on the second stage 330 such that they do not intersect segments of the first stage 328 when viewed along a plane (e.g., the plane 133 of FIG. 3) that is perpendicular to the fuel nozzle axis 314 at an axial position with respect to the fuel nozzle axis 314 of a farthest downstream vortex generator of the set of vortex generators 332.

The spoked wheel shape of the support matrix 326 increases turbulent intensity downstream of the support matrix 326 and the set of vortex generators 332. Further, the segments of the support matrix 326 create alternate zones of high and low static pressure, which helps create uniform mixing of fuel and air downstream of the support matrix 326 and the set of vortex generators 332.

Figure 7:
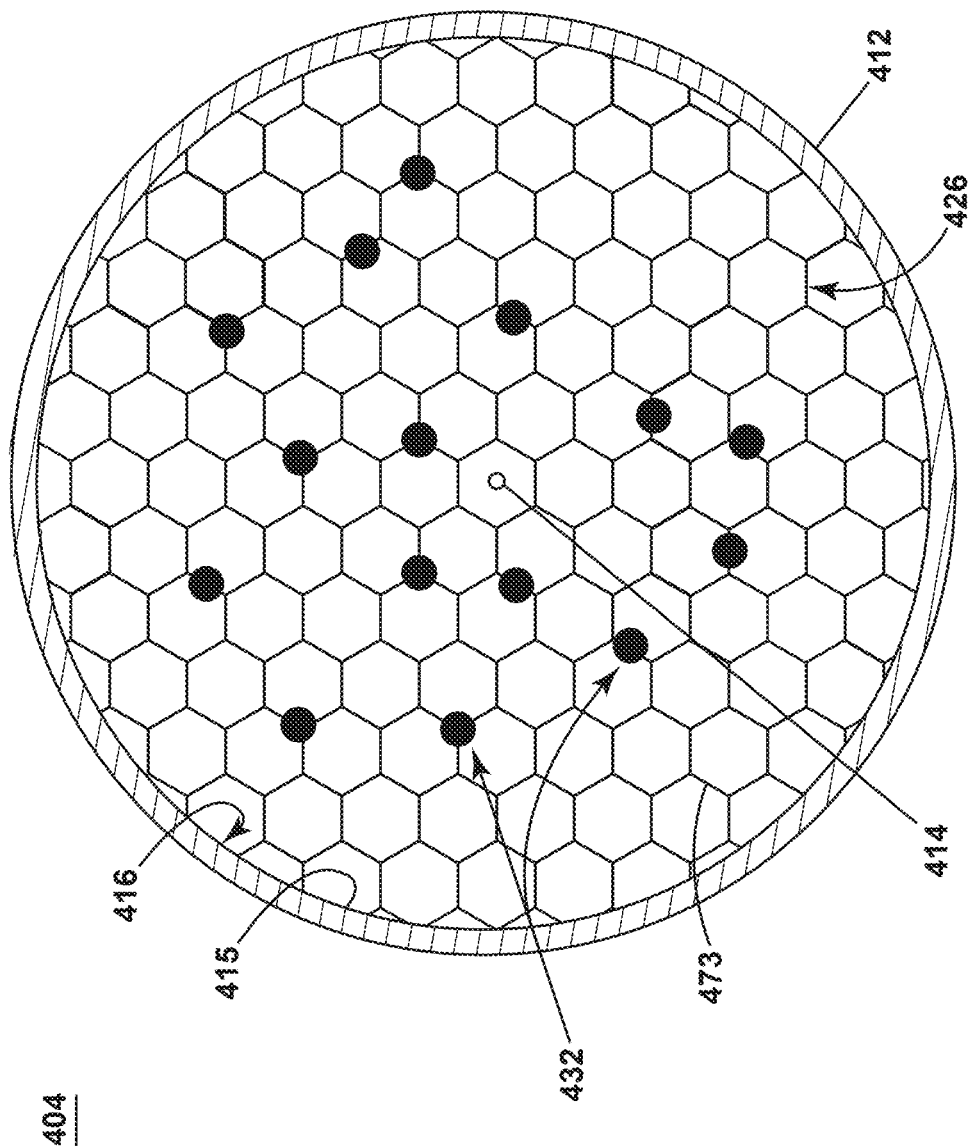
FIG. 7 is a schematic cross-sectional forward looking aft view of an exemplary fuel nozzle suitable for use as the fuel nozzle of FIG. 3, further illustrating a single stage of a support matrix with segments of the stage forming a honeycomb shape, and a set of vortex generators.

FIG. 7 is a schematic cross-sectional forward looking aft view an exemplary fuel nozzle 404 suitable for use as the fuel nozzle 104 of FIG. 3. The fuel nozzle 404 is similar to the fuel nozzle 104 (FIGS. 3-4), 204 (FIG. 5), 304 (FIG. 6) therefore, like parts will be identified with like numerals increased to the 400 series with it being understood that the description of the fuel nozzle 104 applies to the fuel nozzle 404 unless noted otherwise.

The fuel nozzle 404 includes a fuel nozzle body 412. The fuel nozzle body 412 defines a fuel nozzle axis 414. The fuel nozzle body 412 has a channel 416 defined by a fuel nozzle inner surface 415. The fuel nozzle 404 includes a support matrix 426 within the channel 416. The support matrix 426 includes a stage 473. The stage 473 is suitable for use as at least one of the first stage 128, 228, 328, the second stage 130, 230, 330, or a combination thereof. The fuel nozzle 404 includes a set of vortex generators 432. Each vortex generator of the set of vortex generators 432 is suspended within the channel 416 by the support matrix 426.

The fuel nozzle 404 is similar to the fuel nozzle 104 (FIG. 3) in that segments of the stage 473 form a repeating pattern. The repeating pattern, however, is formed as a hexagonal grid as opposed to the web pattern formed by the first stage 128 and the second stage 130 of the support matrix 126 of FIG. 4.

Regarding FIGS. 4-7, each of the web shaped first stage 128 and second stage 130 of FIG. 4, the square grid shaped first stage 228 and second stage 230 of FIG. 5, the spoked wheel shaped first stage 328 and second stage 330 of FIG. 6, and the hexagonal grid shaped stage 473 of FIG. 7 help achieve a uniform fuel air mixture Fm (FIG. 3), as discussed herein. It will be appreciated that each stage shape (e.g., those shown in FIGS. 4-7) has been found to produce a respective turbulence profile. It will further be appreciated that a particular stage shape is selected based on a desired turbulence profile for a given fuel nozzle.

Figure 8:
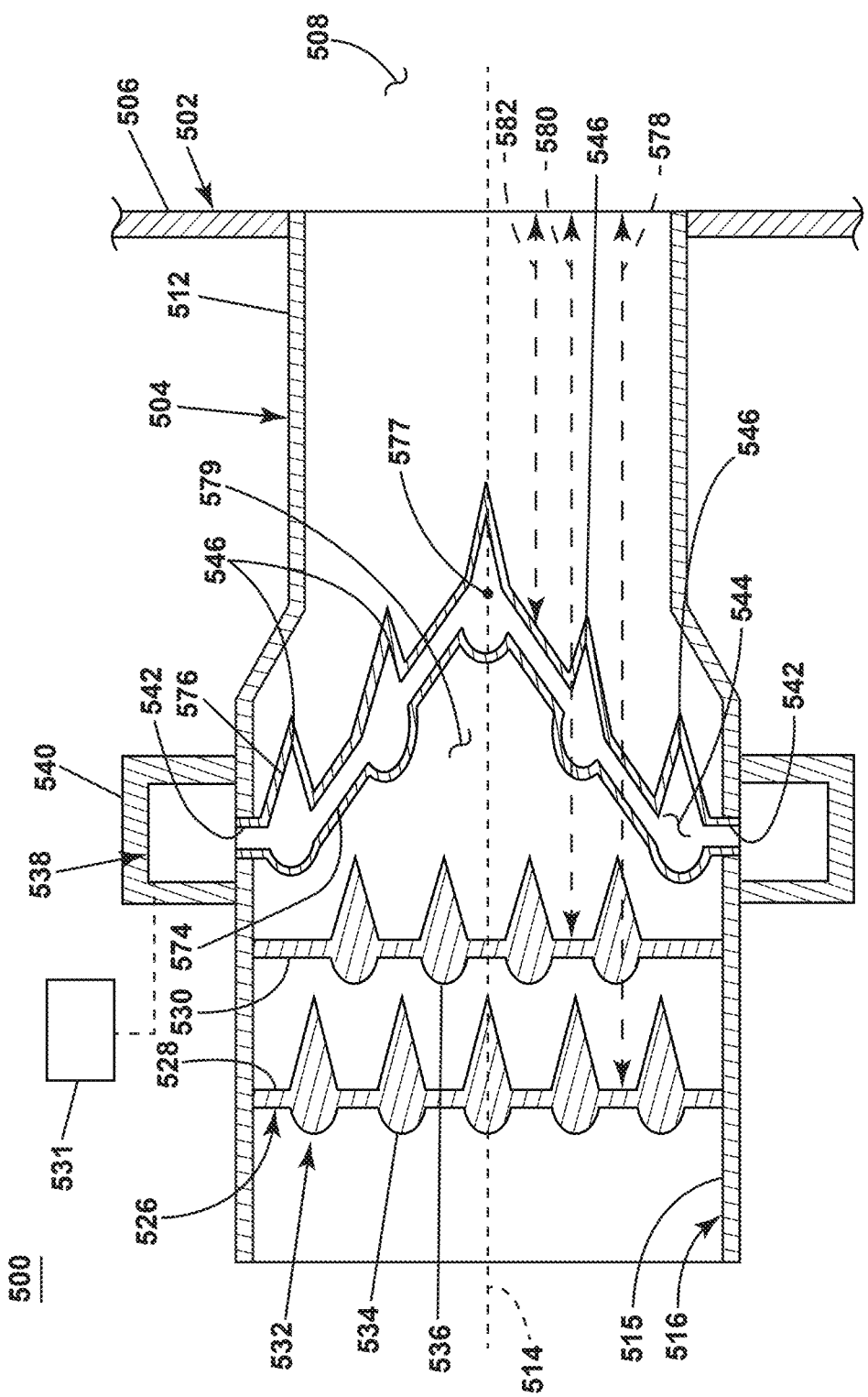
FIG. 8 is a schematic illustration of an exemplary combustion section suitable for use within the turbine engine of FIG. 1, further illustrating a fuel nozzle having a support matrix with a first flat stage, a second flat stage, and a third radially converging stage with an apex located at a farthest downstream portion of the third stage, and a set of vortex generators.

FIG. 8 is a schematic illustration of a combustor portion 500 suitable for use within the turbine engine 10 of FIG. 1. The combustor portion 500 is similar to the combustor portion 31 (FIG. 2), 100 (FIG. 3) therefore, like parts will be identified with like names with it being understood that the description of the combustor portion 31, 100 applies to the combustor portion 500 unless noted otherwise.

The combustor portion 500 includes a combustor 502 and a fuel nozzle 504. The combustor 502 includes a combustor wall 506. The combustor wall 506 at least partially defines a combustion chamber 508. The fuel nozzle 504 includes a fuel nozzle body 512. The fuel nozzle body 512 defines a fuel nozzle axis 514. The fuel nozzle axis 514 extends through a center of the fuel nozzle body 512. The fuel nozzle body 512 has a channel 516 defined by a fuel nozzle inner surface 515. The fuel nozzle 504 includes a support matrix 526 within the channel 516. The fuel nozzle 504 includes a set of vortex generators 532. Each vortex generator of the set of vortex generators 532 is suspended within the channel 516 by the support matrix 526. The fuel nozzle 504 includes a fuel supply 538. The fuel supply 538 is fluidly coupled with a fuel source 531 by a series of tubes, conduits, passageways, or a combination thereof shown in phantom lines. The fuel supply 538 includes a fuel plenum 540, a set of fuel inlet orifices 542, a fuel passage 544, and a set of fuel outlet orifices 546.

The fuel nozzle 504 is similar to the fuel nozzle 104 (FIG. 3) in that the support matrix 526 includes a first stage 528 and a second stage 530 that are each flat. The fuel nozzle 504, particularly the support matrix 526, however, includes an additional third stage 574 that has an arched or cone shape converging to an apex 577 located at a farthest downstream portion of the third stage 574.

The first stage 528 is located axially forward of the second stage 530 with respect to the fuel nozzle axis 514. The second stage 530 is located axially forward of the third stage 574 with respect to the fuel nozzle axis 514. The first stage 528 and the second stage 530 are each flat and extend perpendicularly to the fuel nozzle axis 514. That is, an axial distance 578 with respect to the fuel nozzle axis 514 from the combustion chamber 508 to the first stage 528 is consistent across an entirety of the first stage 528. Similarly, an axial distance 580 with respect to the fuel nozzle axis 514 from the combustion chamber 508 to the second stage 530 is consistent across an entirety of the second stage 530. The third stage 574 has an arched or cone shape that points towards the combustion chamber 508. That is, the third stage 574 converges radially to an apex 577 defined as a farthest downstream portion of the third stage 574, such that an open area 579 is formed between radially opposite portions of the third stage 574. An axial distance 582 with respect the fuel nozzle axis 514 from the combustion chamber 508 to the third stage 574 is shortest at the fuel nozzle axis 514 and increases moving radially outward from the fuel nozzle axis 514 towards the fuel nozzle inner surface 515.

A subset of the set of vortex generators 532 located along the first stage 528 is referred to herein as a subset of first stage vortex generators 534. Another subset of the set of vortex generators 532 located along the second stage 530 is referred to herein as a subset of second stage vortex generators 536. Yet another subset of the set of vortex generators 532 located along the third stage 574 is referred to herein as a subset of third stage vortex generators 576.

The fuel passage 544 extends from the fuel plenum 540 and into a respective portion of the support matrix 526 and a respective portion of the set of vortex generators 532. Particularly, the fuel passage 544 extends through the third stage 574 of the support matrix 526 and the subset of third stage vortex generators 576. The fuel passage 544 opens to the set of fuel outlet orifices 546 provided along at least a portion of the subset of third stage vortex generators 576. In some examples, the set of fuel outlet orifices 546 is only located on a respective portion of the subset of third stage vortex generators 576. It is contemplated that in other non-limiting examples, the fuel passage 544 can additionally or alternatively extend through another stage of the support matrix 526.

By including the third stage 574 having an arch or cone shape pointing towards the combustion chamber 508, in operation, portions of the channel 516 downstream of the support matrix 526 at a peripheral region of the channel 516 near the fuel nozzle inner surface 515 have an increased mixing length compared to portions of the channel 516 downstream of the support matrix 526 at a central region of the channel 516 near the fuel nozzle axis 514. Thus, peak mixedness occurs near the fuel nozzle axis 514 downstream of the support matrix 526 and the set of vortex generators 532, compared to the peripheral region of the channel 516 near the fuel nozzle inner surface 515. Flame speed is lower in portions of the channel 516 downstream of the support matrix 526 near the fuel nozzle inner surface 515 compared to flame speed in portions of the channel 516 downstream of the support matrix 526 near the fuel nozzle axis 514. Such a configuration of the fuel nozzle 504 results in low flashback risk and low NOx emissions. Thus, the fuel nozzle 504 is well suited for high power operations of the combustor portion 500.

Figure 9:
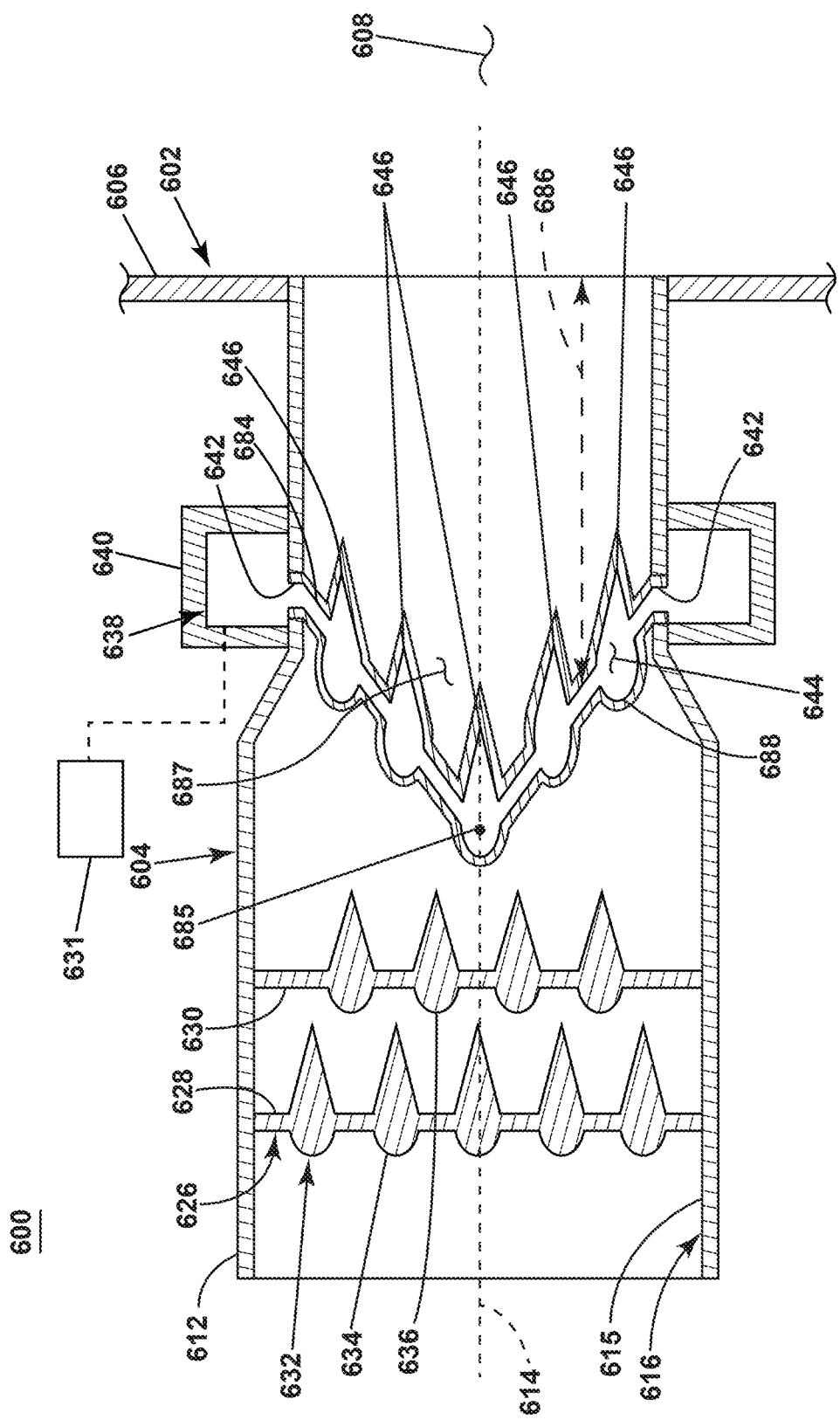
FIG. 9 is a schematic illustration of another combustion section suitable for use within the turbine engine of FIG. 1, further illustrating a fuel nozzle having a support matrix with a first flat stage, a second flat stage, and a third radially converging stage with an apex located at a farthest upstream portion of the third stage, and a set of vortex generators.

FIG. 9 is a schematic illustration of a combustor portion 600 suitable for use within the turbine engine 10 of FIG. 1. The combustor portion 600 is similar to the combustor portion 31 (FIG. 2), 100 (FIG. 3), 500 (FIG. 8) therefore, like parts will be identified with like names with it being understood that the description of the combustor portion 31, 100, 500 applies to the combustor portion 500 unless noted otherwise.

The combustor portion 600 includes a combustor 602 and a fuel nozzle 604. The combustor 602 includes a combustor wall 606. The combustor wall 606 at least partially defines a combustion chamber 608. The fuel nozzle 604 includes a fuel nozzle body 612. The fuel nozzle body 612 defines a fuel nozzle axis 614. The fuel nozzle axis 614 extends through a center of the fuel nozzle body 612. The fuel nozzle body 612 has a channel 616 defined by a fuel nozzle inner surface 615. The fuel nozzle 604 includes a support matrix 626 within the channel 616. The fuel nozzle 604 includes a set of vortex generators 632. Each vortex generator of the set of vortex generators 632 is suspended within the channel 616 by the support matrix 626. The fuel nozzle 604 includes a fuel supply 638. The fuel supply 638 is fluidly coupled with a fuel source 631 by a series of tubes, conduits, passageways, or a combination thereof shown in phantom lines. The fuel supply 638 includes a fuel plenum 640, a set of fuel inlet orifices 642, a fuel passage 644, and a set of fuel outlet orifices 646.

The fuel nozzle 604 is similar to the fuel nozzle 104 (FIG. 3) in that the support matrix 626 includes a first stage 628 and a second stage 630 that are each flat. The fuel nozzle 604, particularly the support matrix 626, however, includes a third stage 684 that has an arched or cone shape converging to an apex 685 located at a farthest upstream portion of the third stage 684.

The first stage 628 is located axially forward of the second stage 630 with respect to the fuel nozzle axis 614. The second stage 630 is located axially forward of the third stage 684 with respect to the fuel nozzle axis 614.

The third stage 684 has an arched or cone shape that points away from the combustion chamber 608. That is, the third stage 684 converges radially to the apex 685 defined as a farthest upstream portion of the third stage 684, such that an open area 687 is formed between radially opposite portions of the third stage 684. An axial distance 686 with respect the fuel nozzle axis 614 from the combustion chamber 608 to the third stage 684 is longest at the fuel nozzle axis 614 and decreases moving radially outward from the fuel nozzle axis 614 towards the fuel nozzle inner surface 615.

A subset of the set of vortex generators 632 located along the first stage 628 is referred to herein as a subset of first stage vortex generators 634. Another subset of the set of vortex generators 632 located along the second stage 630 is referred to herein as a subset of second stage vortex generators 636. Yet another subset of the set of vortex generators 632 located along the third stage 684 is referred to herein as a subset of third stage vortex generators 688.

The fuel passage 644 extends from the fuel plenum 640 and into a respective portion of the support matrix 626 and a respective portion of the set of vortex generators 632. Particularly, the fuel passage 644 extends through the third stage 684 of the support matrix 626 and the subset of third stage vortex generators 688. The fuel passage 644 opens to the set of fuel outlet orifices 646 provided along at least a portion of the subset of third stage vortex generators 688. In some examples, the set of fuel outlet orifices 646 is only located on a respective portion of the subset of third stage vortex generators 688. It is contemplated that in other non-limiting examples, the fuel passage 644 can additionally or alternatively extend through another stage of the support matrix 626.

By including the third stage 684 having an arch or cone shape pointing away from the combustion chamber 608, in operation, portions of the channel 616 downstream of the support matrix 626 at a central region of the channel 616 near the fuel nozzle axis 614 have an increased mixing length compared to portions of the channel 616 downstream of the support matrix 626 at a peripheral region of the channel 616 near the fuel nozzle inner surface 615. Thus, peak mixedness occurs near the fuel nozzle inner surface 615 downstream of the support matrix 626 and the set of vortex generators 632, compared to the central region of the channel 616 near the fuel nozzle axis 614. Such a configuration of the fuel nozzle 604 results in better flame stability, which is well suited for low power operations of the combustor portion 600.

The benefit of the present disclosure includes a fuel nozzle with increased mixing capability when compared to a conventional fuel nozzle. For example, the conventional fuel nozzle can include a swirler formed as a vane that produces a swirled air flow within the fuel nozzle. The present disclosure, however, includes a set of vortex generators located within the fuel nozzle away from the walls of the fuel nozzle. The use of the turbulent air flow has been found to be especially well adapted to mix fuel within the compressed air flow in order to create a homogenous mixture or near homogenous mixture of air and fuel. As such, the use of the support matrix and the set of vortex generators, as described herein, increases the mixing efficiency of the fuel nozzle when compared to the conventional fuel nozzle. Increasing the mixing efficiency reduces the risk of flashback within the fuel nozzle.

While described with respect to a turbine engine, it should be appreciated that the combustor as described herein can be for any engine having a combustor. It should be appreciated that application of aspects of the disclosure discussed herein are applicable to engines with propeller sections or fan and booster sections along with turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated but is done for brevity of description. Thus, the various features of the different embodiments can be mixed and matched as desired to form new embodiments, whether or not the new embodiments are expressly described. All combinations or permutations of features described herein are covered by this disclosure. For example, stages of the support matrix can have different shapes, including a web shape as depicted in FIG. 4, a square or rectangular grid shape as depicted in FIG. 5, a spoked wheel shape as depicted in FIG. 6, or a hexagonal grid as depicted in FIG. 7. Additionally or alternatively, the combustor portions of FIG. 2 can include a combination of the combustion portions of FIGS. 3, 8 and 9, such that the particular combustor portions of highest efficiency are used during different modes of operation of the turbine engine. Additionally or alternatively still, the combustor portions of FIGS. 8 and 9 can include the second fuel supply of FIG. 3.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A gas turbine engine comprising a compressor section, a combustion section, and a turbine section in a serial flow arrangement, with the combustion section having a fuel nozzle comprising a fuel nozzle body defining an axis and having an inner surface defining a channel fluidly coupled to a combustion chamber, a support matrix located within the channel comprising a plurality of segments which intersect each other when viewed from aft, and a set of vortex generators located on the support matrix.

The gas turbine engine of any preceding clause, wherein the inner surface is located a radial distance from the axis, and the set of vortex generators is located within a region of the channel that extends to less than or equal to 80% of the radial distance, with 100% of the radial distance being the inner surface.

The gas turbine engine of any preceding clause, wherein the set of vortex generators are located within a region of the channel that extends from greater than or equal to 10% of the radial distance, with 100% of the radial distance being the inner surface.

The gas turbine engine of any preceding clause, wherein at least a portion of a set of fuel outlet orifices is provided along at least a portion of the set of vortex generators.

The gas turbine engine of any preceding clause, wherein the set of fuel outlet orifices includes an angled fuel outlet orifice that injects a flow of fuel at an angle with respect to the axis.

The gas turbine engine of any preceding clause, wherein the support matrix includes a plurality of local junctions where segments of the support matrix meet each other, with the set of vortex generators being located at a majority of local junctions of the plurality of local junctions.

The gas turbine engine of any preceding clause, wherein the fuel nozzle further comprises a fuel passage extending through a respective portion of the support matrix and a respective portion of the set of vortex generators, the fuel passage opening to the channel at the set of fuel outlet orifices, and a fuel plenum circumscribing at least a portion of the channel and being fluidly coupled to the fuel passage.

The gas turbine engine of any preceding clause, wherein the channel is defined by a cross-sectional area along a plane perpendicular to the axis and intersecting a furthest downstream portion of the set of vortex generators, and a flow area of the channel that is not obstructed by the support matrix or the set of vortex generators is greater than or equal to 40% and less than or equal to 80% of the cross-sectional area.

The gas turbine engine of any preceding clause, wherein each fuel outlet orifice of the set of fuel outlet orifices includes a respective hydraulic diameter that is greater than or equal to 6 milli inches and less than or equal to 100 milli inches.

The gas turbine engine of any preceding clause, wherein a compressed air flow from the compressor section is fed to the channel, the compressed air flow having a first pressure, and a fuel is exhausted into the channel from the set of fuel outlet orifices, the fuel having a second pressure, with the second pressure being greater than or equal to 1.01 times and less than or equal to 1.5 times the first pressure.

The gas turbine engine of any preceding clause, wherein at least a portion of the set of fuel outlet orifices is provided along the fuel nozzle body.

The gas turbine engine of any preceding clause, wherein the set of fuel outlet orifices is configured to exhaust a fuel into the channel such that a vector of the fuel is non-parallel to the axis.

The gas turbine engine of any preceding clause, wherein the support matrix includes a first stage and a second stage, the first stage being upstream of and spaced from the second stage.

The gas turbine engine of any preceding clause, wherein the set of vortex generators includes a subset of first stage vortex generators located along the first stage and a subset of second stage vortex generators located along the second stage.

The gas turbine engine of any preceding clause, wherein the fuel nozzle comprises a set of fuel outlet orifices exhausting into the channel and located only along a respective portion of the subset of second stage vortex generators.

The gas turbine engine of any preceding clause, wherein the support matrix extends from the inner surface and at least one stage of the support matrix converges radially to an apex defined as a farthest downstream portion of the at least one stage such that an open area is formed between radially opposite portions of the at least one stage upstream of the apex.

The gas turbine engine of any preceding clause, wherein the support matrix extends from the inner surface and at least one stage of the support matrix converges radially to an apex defined as a farthest upstream portion of the at least one stage such that an open area is formed between radially opposite portions of the at least one stage downstream of the apex.

The gas turbine engine of any preceding clause, wherein the support matrix is in the shape of one of a web, a hexagonal grid, a rectangular grid, or a spoked wheel.

The gas turbine engine of any preceding clause, wherein the set of vortex generators has a triangular cross-sectional shape, an airfoil cross-sectional shape, a delta wing cross-sectional shape, a wish bone cross-sectional shape, a circular cross-sectional shape or a combination thereof.

The gas turbine engine of any preceding clause, wherein at least a subset of the set of vortex generators has the airfoil cross-sectional shape.

The gas turbine engine of any preceding clause, wherein a compressed air flow from the compressor section is fed to the channel, and the support matrix and the set of vortex generators are configured to swirl the compressed air flow such that the compressed air flow downstream of the support matrix and the set of vortex generators has a swirl number of greater than or equal to 0.2 and less than or equal to 1.2.

The gas turbine engine of any preceding clause, wherein the fuel nozzle is configured to exhaust a fuel air mixture through a fuel nozzle outlet, the fuel air mixture having a hydrogen-containing fuel.

A combustion section having a fuel nozzle comprising a fuel nozzle body defining an axis and having an inner surface defining a channel fluidly coupled to a combustion chamber, a support matrix located within the channel comprising a plurality of segments which intersect each other when viewed from aft, and a set of vortex generators located on the support matrix.

The combustion section of any preceding clause, wherein the inner surface is located a radial distance from the axis, and the set of vortex generators is located within a region of the channel that extends to less than or equal to 80% of the radial distance, with 100% of the radial distance being the inner surface.

The combustion section of any preceding clause, wherein the set of vortex generators are located within a region of the channel that extends from greater than or equal to 10% of the radial distance, with 100% of the radial distance being the inner surface.

The combustion section of any preceding clause, wherein at least a portion of a set of fuel outlet orifices is provided along at least a portion of the set of vortex generators.

The combustion section of any preceding clause, wherein the set of fuel outlet orifices includes an angled fuel outlet orifice that injects a flow of fuel at an angle with respect to the axis.

The combustion section of any preceding clause, wherein the support matrix includes a plurality of local junctions where segments of the support matrix meet each other, with the set of vortex generators being located at a majority of local junctions of the plurality of local junctions.

The combustion section of any preceding clause, wherein the fuel nozzle further comprises a fuel passage extending through a respective portion of the support matrix and a respective portion of the set of vortex generators, the fuel passage opening to the channel at the set of fuel outlet orifices, and a fuel plenum circumscribing at least a portion of the channel and being fluidly coupled to the fuel passage.

The combustion section of any preceding clause, wherein the channel is defined by a cross-sectional area along a plane perpendicular to the axis and intersecting a furthest downstream portion of the set of vortex generators, and a flow area of the channel that is not obstructed by the support matrix or the set of vortex generators is greater than or equal to 40% and less than or equal to 80% of the cross-sectional area.

The combustion section of any preceding clause, wherein each fuel outlet orifice of the set of fuel outlet orifices includes a respective hydraulic diameter that is greater than or equal to 6 milli inches and less than or equal to 100 milli inches.

The combustion section of any preceding clause, wherein a compressed air flow from the compressor section is fed to the channel, the compressed air flow having a first pressure, and a fuel is exhausted into the channel from the set of fuel outlet orifices, the fuel having a second pressure, with the second pressure being greater than or equal to 1.01 times and less than or equal to 1.5 times the first pressure.

The combustion section of any preceding clause, wherein at least a portion of the set of fuel outlet orifices is provided along the fuel nozzle body.

The combustion section of any preceding clause, wherein the set of fuel outlet orifices is configured to exhaust a fuel into the channel such that a vector of the fuel is non-parallel to the axis.

The combustion section of any preceding clause, wherein the support matrix includes a first stage and a second stage, the first stage being upstream of and spaced from the second stage.

The combustion section of any preceding clause, wherein the set of vortex generators includes a subset of first stage vortex generators located along the first stage and a subset of second stage vortex generators located along the second stage.

The combustion section of any preceding clause, wherein the fuel nozzle comprises a set of fuel outlet orifices exhausting into the channel and located only along a respective portion of the subset of second stage vortex generators.

The combustion section of any preceding clause, wherein the support matrix extends from the inner surface and at least one stage of the support matrix converges radially to an apex defined as a farthest downstream portion of the at least one stage such that an open area is formed between radially opposite portions of the at least one stage upstream of the apex.

The combustion section of any preceding clause, wherein the support matrix extends from the inner surface and at least one stage of the support matrix converges radially to an apex defined as a farthest upstream portion of the at least one stage such that an open area is formed between radially opposite portions of the at least one stage downstream of the apex.

The combustion section of any preceding clause, wherein the support matrix is in the shape of one of a web, a hexagonal grid, a rectangular grid, or a spoked wheel.

The combustion section of any preceding clause, wherein the set of vortex generators has a triangular cross-sectional shape, an airfoil cross-sectional shape, a delta wing cross-sectional shape, a wish bone cross-sectional shape, a circular cross-sectional shape or a combination thereof.

The combustion section of any preceding clause, wherein at least a subset of the set of vortex generators has the airfoil cross-sectional shape.

The combustion section of any preceding clause, wherein a compressed air flow from the compressor section is fed to the channel, and the support matrix and the set of vortex generators are configured to swirl the compressed air flow such that the compressed air flow downstream of the support matrix and the set of vortex generators has a swirl number of greater than or equal to 0.2 and less than or equal to 1.2.

The combustion section of any preceding clause, wherein the fuel nozzle is configured to exhaust a fuel air mixture through a fuel nozzle outlet, the fuel air mixture having a hydrogen-containing fuel.

A fuel nozzle comprising a fuel nozzle body defining an axis and having an inner surface defining a channel, a support matrix located within the channel comprising a plurality of segments which intersect each other when viewed from aft, and a set of vortex generators located on the support matrix.

The fuel nozzle of any preceding clause, wherein the inner surface is located a radial distance from the axis, and the set of vortex generators is located within a region of the channel that extends to less than or equal to 80% of the radial distance, with 100% of the radial distance being the inner surface.

The fuel nozzle of any preceding clause, wherein the set of vortex generators are located within a region of the channel that extends from greater than or equal to 10% of the radial distance, with 100% of the radial distance being the inner surface.

The fuel nozzle of any preceding clause, wherein at least a portion of a set of fuel outlet orifices is provided along at least a portion of the set of vortex generators.

The fuel nozzle of any preceding clause, wherein the set of fuel outlet orifices includes an angled fuel outlet orifice that injects a flow of fuel at an angle with respect to the axis.

The fuel nozzle of any preceding clause, wherein the support matrix includes a plurality of local junctions where segments of the support matrix meet each other, with the set of vortex generators being located at a majority of local junctions of the plurality of local junctions.

The fuel nozzle of any preceding clause, wherein the fuel nozzle further comprises a fuel passage extending through a respective portion of the support matrix and a respective portion of the set of vortex generators, the fuel passage opening to the channel at the set of fuel outlet orifices, and a fuel plenum circumscribing at least a portion of the channel and being fluidly coupled to the fuel passage.

The fuel nozzle of any preceding clause, wherein the channel is defined by a cross-sectional area along a plane perpendicular to the axis and intersecting a furthest downstream portion of the set of vortex generators, and a flow area of the channel that is not obstructed by the support matrix or the set of vortex generators is greater than or equal to 40% and less than or equal to 80% of the cross-sectional area.

The fuel nozzle of any preceding clause, wherein each fuel outlet orifice of the set of fuel outlet orifices includes a respective hydraulic diameter that is greater than or equal to 6 milli inches and less than or equal to 100 milli inches.

The fuel nozzle of any preceding clause, wherein a compressed air flow is fed to the channel, the compressed air flow having a first pressure, and a fuel is exhausted into the channel from the set of fuel outlet orifices, the fuel having a second pressure, with the second pressure being greater than or equal to 1.01 times and less than or equal to 1.5 times the first pressure.

The fuel nozzle of any preceding clause, wherein at least a portion of the set of fuel outlet orifices is provided along the fuel nozzle body.

The fuel nozzle of any preceding clause, wherein the set of fuel outlet orifices is configured to exhaust a fuel into the channel such that a vector of the fuel is non-parallel to the axis.

The fuel nozzle of any preceding clause, wherein the support matrix includes a first stage and a second stage, the first stage being upstream of and spaced from the second stage.

The fuel nozzle of any preceding clause, wherein the set of vortex generators includes a subset of first stage vortex generators located along the first stage and a subset of second stage vortex generators located along the second stage.

The fuel nozzle of any preceding clause, wherein the fuel nozzle comprises a set of fuel outlet orifices exhausting into the channel and located only along a respective portion of the subset of second stage vortex generators.

The fuel nozzle of any preceding clause, wherein the support matrix extends from the inner surface and at least one stage of the support matrix converges radially to an apex defined as a farthest downstream portion of the at least one stage such that an open area is formed between radially opposite portions of the at least one stage upstream of the apex.

The fuel nozzle of any preceding clause, wherein the support matrix extends from the inner surface and at least one stage of the support matrix converges radially to an apex defined as a farthest upstream portion of the at least one stage such that an open area is formed between radially opposite portions of the at least one stage downstream of the apex.

The fuel nozzle of any preceding clause, wherein the support matrix is in the shape of one of a web, a hexagonal grid, a rectangular grid, or a spoked wheel.

The fuel nozzle of any preceding clause, wherein the set of vortex generators has a triangular cross-sectional shape, an airfoil cross-sectional shape, a delta wing cross-sectional shape, a wish bone cross-sectional shape, a circular cross-sectional shape or a combination thereof.

The fuel nozzle of any preceding clause, wherein at least a subset of the set of vortex generators has the airfoil cross-sectional shape.

The fuel nozzle of any preceding clause, wherein a compressed air flow from the compressor section is fed to the channel, and the support matrix and the set of vortex generators are configured to swirl the compressed air flow such that the compressed air flow downstream of the support matrix and the set of vortex generators has a swirl number of greater than or equal to 0.2 and less than or equal to 1.2.

The fuel nozzle of any preceding clause, wherein the fuel nozzle is configured to exhaust a fuel air mixture through a fuel nozzle outlet, the fuel air mixture having a hydrogen-containing fuel.

What is claimed is:

1. A gas turbine engine comprising:
 a compressor section, a combustion section, and a turbine section in a serial flow arrangement, with the combustion section having a fuel nozzle comprising:
  a fuel nozzle body defining an axis and having an inner surface defining a channel fluidly coupled to a combustion chamber;
  a support matrix located within the channel comprising a plurality of segments which intersect each other when viewed from aft; and
  a set of vortex generators located on the support matrix, wherein the inner surface is located a radial distance from the axis and the set of vortex generators is confined to within a region of the channel that extends to less than or equal to 80% of the radial distance, with 100% of the radial distance being the inner surface, to facilitate fuel-air mixing radially inwardly spaced from the inner surface.

2. The gas turbine engine of claim 1, wherein at least a portion of a set of fuel outlet orifices is provided along at least a portion of the set of vortex generators.

3. The gas turbine engine of claim 2, wherein the set of fuel outlet orifices includes an angled fuel outlet orifice that injects a flow of fuel at an angle with respect to the axis.

4. The gas turbine engine of claim 2, wherein the support matrix includes a plurality of local junctions where segments of the support matrix meet each other, with the set of vortex generators being located at a majority of local junctions of the plurality of local junctions.

5. The gas turbine engine of claim 2, wherein the fuel nozzle further comprises:
 a fuel passage extending through a respective portion of the support matrix and a respective portion of the set of vortex generators, the fuel passage opening to the channel at the set of fuel outlet orifices; and
 a fuel plenum circumscribing at least a portion of the channel and being fluidly coupled to the fuel passage.

6. The gas turbine engine of claim 2, wherein:
 the channel is defined by a cross-sectional area along a plane perpendicular to the axis and intersecting a furthest downstream portion of the set of vortex generators; and
 a flow area of the channel that is not obstructed by the support matrix or the set of vortex generators is greater than or equal to 40% and less than or equal to 80% of the cross-sectional area.

7. The gas turbine engine of claim 2, wherein each fuel outlet orifice of the set of fuel outlet orifices includes a respective hydraulic diameter that is greater than or equal to 6 milli inches and less than or equal to 100 milli inches.

8. The gas turbine engine of claim 2, wherein:
   a compressed air flow from the compressor section is fed to the channel, the compressed air flow having a first pressure; and
   a fuel is exhausted into the channel from the set of fuel outlet orifices, the fuel having a second pressure, with the second pressure being greater than or equal to 1.01 times and less than or equal to 1.5 times the first pressure.

9. The gas turbine engine of claim 2, wherein the set of fuel outlet orifices is configured to exhaust a fuel into the channel such that a vector of the fuel is non-parallel to the axis.

10. The gas turbine engine of claim 1, wherein the support matrix includes a first stage and a second stage, the first stage being upstream of and spaced from the second stage.

11. The gas turbine engine of claim 10, wherein the set of vortex generators includes a subset of first stage vortex generators located along the first stage and a subset of second stage vortex generators located along the second stage.

12. The gas turbine engine of claim 11, wherein the fuel nozzle comprises a set of fuel outlet orifices exhausting into the channel and located only along a respective portion of the subset of second stage vortex generators.

13. The gas turbine engine of claim 1, wherein the support matrix extends from the inner surface and at least one stage of the support matrix converges radially to an apex defined as a farthest downstream portion of the at least one stage such that an open area is formed between radially opposite portions of the at least one stage upstream of the apex.

14. The gas turbine engine of claim 1, wherein the support matrix extends from the inner surface and at least one stage of the support matrix converges radially to an apex defined as a farthest upstream portion of the at least one stage such that an open area is formed between radially opposite portions of the at least one stage downstream of the apex.

15. The gas turbine engine of claim 1, wherein the support matrix is in the shape of one of a web, a hexagonal grid, a rectangular grid, or a spoked wheel.

16. The gas turbine engine of claim 1, wherein at least a subset of the set of vortex generators has an airfoil cross-sectional shape.

17. The gas turbine engine of claim 1, wherein a compressed air flow from the compressor section is fed to the channel; and
   the support matrix and the set of vortex generators are configured to swirl the compressed air flow such that the compressed air flow downstream of the support matrix and the set of vortex generators has a swirl number of greater than or equal to 0.2 and less than or equal to 1.2.

18. The gas turbine engine of claim 1, wherein the fuel nozzle is configured to exhaust a fuel air mixture through a fuel nozzle outlet, the fuel air mixture having a hydrogen-containing fuel.

\* \* \* \* \*